United States Patent
Jung

(10) Patent No.: US 11,562,236 B2
(45) Date of Patent: Jan. 24, 2023

(54) AUTOMATICALLY LABELING CAPABILITY FOR TRAINING AND VALIDATION DATA FOR MACHINE LEARNING

(71) Applicant: LG ELECTRONICS INC., Seoul (KR)

(72) Inventor: Namsoon Jung, Seoul (KR)

(73) Assignee: LG ELECTRONICS INC., Seoul (KR)

(*) Notice: Subject to any disclaimer, the term of this patent is extended or adjusted under 35 U.S.C. 154(b) by 435 days.

(21) Appl. No.: 16/805,595

(22) Filed: Feb. 28, 2020

(65) Prior Publication Data

US 2021/0056412 A1 Feb. 25, 2021

Related U.S. Application Data

(60) Provisional application No. 62/889,056, filed on Aug. 20, 2019.

(51) Int. Cl.
*G06N 3/08* (2006.01)
*G06T 3/40* (2006.01)
(Continued)

(52) U.S. Cl.
CPC .......... *G06N 3/08* (2013.01); *G06N 3/0454* (2013.01); *G06N 5/04* (2013.01); *G06N 20/00* (2019.01);
(Continued)

(58) Field of Classification Search
CPC .......... G06N 3/08; G06N 3/0454; G06N 5/04; G06N 20/00; G06N 3/0481; G06N 3/0445;
(Continued)

(56) References Cited

U.S. PATENT DOCUMENTS

2007/0143284 A1* 6/2007 Lee .................... G06F 40/44
707/999.005
2012/0269436 A1* 10/2012 Mensink ............ G06V 10/764
382/180
(Continued)

FOREIGN PATENT DOCUMENTS

KR 20180120061 A * 11/2018
KR 1020180120061 11/2018
(Continued)

OTHER PUBLICATIONS

KR20180120061A (Machine Translation on Jun. 30, 2022) (Year: 2018).*
PCT International Application No. PCT/KR2020/006250, Written Opinion of the International Searching Authority dated Aug. 14, 2020, 9 pages.

*Primary Examiner* — Michael Le
(74) *Attorney, Agent, or Firm* — Lee, Hong, Degerman, Kang & Waimey PC

(57) ABSTRACT

A method for enabling an labeling capability for training and validation data at an edge device to support neural network transfer learning capability is provided. The method includes: inputting candidate data into a first neural network to filter the candidate data by selecting a subset of candidate data based on an output of the first neural network, performing a confidence upgrade check on the subset of candidate data by: (1) performing a data consistency check by generating augmented data from each candidate data from among the subset of candidate data, (2) inputting the subset of candidate data into a second neural network that is trained using data from an environment to determine a second confidence condition, and (3) performing a clustering on the subset of candidate data, and automatically labeling, as training data, the subset of candidate data in accordance with a confidence level label.

21 Claims, 12 Drawing Sheets

(51) Int. Cl.
*G06T 3/60* (2006.01)
*G06N 3/04* (2006.01)
*G06N 5/04* (2006.01)
*G06N 20/00* (2019.01)

(52) U.S. Cl.
CPC .............. *G06T 3/40* (2013.01); *G06T 3/60* (2013.01); *G06T 2207/20081* (2013.01); *G06T 2207/20084* (2013.01)

(58) Field of Classification Search
CPC . G06N 3/02; G06N 99/00; G06N 3/04; G06T 3/40; G06T 3/60; G06T 2207/20081; G06T 2207/20084; G06T 1/20; G06T 7/136; G06F 17/30; G06K 9/00
See application file for complete search history.

(56) References Cited

U.S. PATENT DOCUMENTS

2015/0356457 A1* 12/2015 Ghosh ................... G06F 16/906
706/12
2017/0169315 A1* 6/2017 Vaca Castano ...... G06V 10/454

FOREIGN PATENT DOCUMENTS

WO 2017134519 7/2017
WO WO-2017134519 A1 * 8/2017 ............. G06F 16/55

* cited by examiner

AUTOMATICALLY LABELING CAPABILITY FOR TRAINING AND VALIDATION DATA FOR MACHINE LEARNING

CROSS-REFERENCE TO RELATED APPLICATIONS

Pursuant to 35 U.S.C. § 119(e), this application claims the benefit of U.S. Provisional Patent Application No. 62/889,056, filed on Aug. 20, 2019, the contents of which are hereby incorporated by reference herein in its entirety.

FIELD

The present disclosure generally relates to enabling an automatically labeling capability for training and validation data at an edge device to support neural network transfer learning capability.

BACKGROUND

Machine learning is an area of artificial intelligence that includes a field of study that gives computers the capability to learn without being explicitly programmed. Specifically, machine learning is a technology used for researching and constructing a system for learning, predicting, and improving its own performance based on empirical data and an algorithm for the same. The machine learning algorithms take a method of constructing a specific model in order to obtain the prediction or the determination based on the input data, rather than performing the strictly defined static program instructions.

The learning method of a neural network such as a Convolutional Neural Network (CNN) can be largely classified into supervised learning, unsupervised learning, semi-supervised learning, and reinforcement learning. Supervised learning is a type of system in which both input and desired output data are provided and labeled for classification to provide a learning basis for further data processing. Unsupervised learning is when an algorithm is only given input data, without corresponding output values, as a training set. Unlike supervised learning, there are no preset correct output values, or teachers. Instead, in unsupervised learning, algorithms are able to function freely in order to learn more about the data and present findings.

The semi-supervised learning is a combination of supervised and unsupervised machine learning methods, and utilizes both labeled training data and unlabeled training data. The goal of semi-supervised learnings is to convert the unlabeled training data into labeled training data by classifying the unlabeled training data using the already labeled training data. As such, one of the key characteristics of the semi-supervised learning method is the proximity between the labeled data and the unlabeled data. Reinforcement learning is a type of machine learning where a reinforcement agent learns how to behave in an environment by performing actions and seeing the results. Reinforcement learning differs from supervised learning in a way that in supervised learning the training data is associated with the answer key, so the model is trained with the correct answer itself. In contrast, in reinforcement learning, there is no preset answer, so the reinforcement agent decides what to do to perform the given task.

For a supervised learning method with a convolutional neural network, it is necessary to label training data that is newly captured through sensors connected to an edge device. However, labeling training data is an expensive process because supervised machine learning algorithms require a large amount of training data. The large amounts of training data also require a significant amount of manual human labor in order to manually label the training data with large enough volumes so that the performance of the trained neural network converges to an intended outcome. For example, supervised machine learning algorithms are required to have a large enough training data for a classification performance to result in an accuracy higher than a preset minimum threshold in a specific application domain. However, since it is not practical to manually label the training data when the edge device is shipped to a real-world environment, the present disclosure provides a novel method for generating training data by labeling input data.

It follows that a possible solution to overcome the challenges of acquiring large enough training data without manual labeling is to automatically generate labels for unlabeled data. But there is no guarantee whether the neural network will perform within accepted parameters over a longer time period and after a series of model parameter updates based on the automatically generated labeled training data. Therefore, a need also arises for the process of validating the performance of a neural network after a series of model parameter updates.

During semi-supervised learning and/or unsupervised learning, a machine learning algorithm may utilize a set of labeled data in order to approximate another set of unlabeled data during a transfer learning phase. However, since the results of the label approximation are by nature non-deterministic, the proposed label approximations and consequent output of the transfer learning using the approximated labels by the neural network are validated for degree of changes and correctness.

The validation is particularly important when the transfer learning is executed on an edge device because it is necessary to validate whether the newly learned neural network model parameters improve the performance of the neural network before updating the pre-existing model parameters. Accordingly, since it is also not practical to manually validate the newly learned model parameters when the edge device is shipped to the real-world environment, the present disclosure also provides a novel method for automatically validating the newly learned model parameters during a training phase on the edge device.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
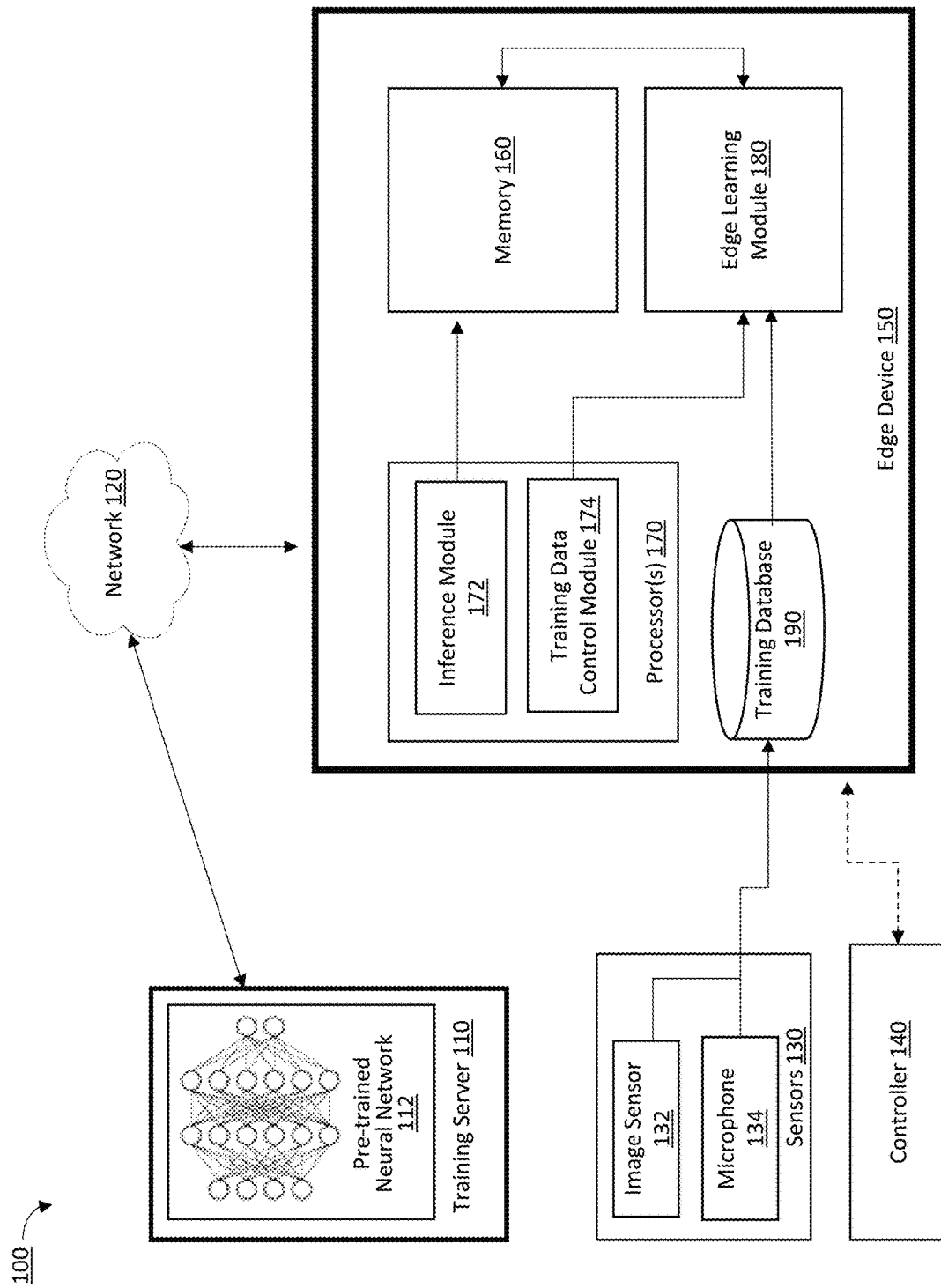
FIG. 1 is a block diagram of an example edge learning processing system in accordance with some implementations.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

The present disclosure is directed to enabling an automatically labeling capability for training and validation data at an edge device to support neural network transfer learning capability. The present disclosure is also directed to automatically validating whether newly learned neural network model parameters improve a performance of the neural network before updating the pre-existing model parameters.

An embodiment of the present disclosure includes a method inputting candidate data into a first neural network to filter the candidate data by selecting a subset of the candidate data based on an output of the first neural network, wherein the first neural network is pretrained; performing a confidence upgrade check on the subset of candidate data by: performing a data consistency check by generating augmented data from each candidate data from among the subset of candidate data, wherein the generated augmented data are used as inputs into the first neural network to determine a first confidence condition for each of the subset of candidate data, inputting the subset of candidate data into a second neural network that is trained using data from an environment to determine a second confidence condition, wherein the second neural network is a version of the first neural network overfitted to the environment, and performing a clustering on the subset of candidate data, wherein results from the clustering on the subset of candidate data are used as inputs into a third machine learning approach to determine a third confidence condition; and automatically labeling, as training data, the subset of candidate data from among the subset of candidate data in accordance with a confidence level label based on the first confidence condition, the second confidence condition and the third confidence condition.

Another embodiment of the present disclosure includes a device comprising one or more processors; a non-transitory memory; and one or more programs stored in the non-transitory memory, which, when executed by the one or more processors, cause the edge device to be configured to perform: inputting candidate data into a first neural network to filter the candidate data by selecting a subset of the candidate data based on an output of the first neural network, wherein the first neural network is pretrained; performing a confidence upgrade check on the subset of candidate data by: performing a data consistency check by generating augmented data from each candidate data from among the subset of candidate data, wherein the generated augmented data are used as inputs into the first neural network to determine a first confidence condition for each of the subset of candidate data, inputting the subset of candidate data into a second neural network that is trained using data from an environment to determine a second confidence condition, wherein the second neural network is a version of the first neural network overfitted to the environment, and performing a clustering on the subset of candidate data, wherein results from the clustering on the subset of candidate data are used as inputs into a third machine learning approach to determine a third confidence condition; and automatically labeling the subset of candidate data from among the subset of candidate data in accordance with a confidence level label based on the first confidence condition, the second confidence condition and the third confidence condition. The present disclosure is not limited to what has been described above, and other aspects and advantages of the present disclosure not mentioned above will be understood through the following description of embodiments of the present disclosure. Further, it will be understood that the aspects and advantages of the present disclosure may be achieved by the configurations described in claims and combinations thereof.

In accordance with some implementations, an electronic device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of an electronic device, cause the electronic device to perform or cause performance of any of the methods described herein. In accordance with some implementations, an electronic device includes: one or more processors, a non-transitory memory, and means for performing or causing performance of any of the methods described herein.

DETAILED DESCRIPTION

Hereinafter, the embodiments disclosed in the present specification will be described in detail with reference to the accompanying drawings, the same or similar elements regardless of a reference numeral are denoted by the same reference numeral, and a duplicate description thereof will be omitted. In the following description, the terms "module" and "unit" for referring to elements are assigned and used exchangeably in consideration of convenience of explanation, and thus, the terms per se do not necessarily have different meanings or functions. Wherever possible, the same reference numbers will be used throughout the drawings to refer to the same or like parts. In the following description, known functions or structures, which may confuse the substance of the present disclosure, are not explained. The accompanying drawings are used to help easily explain various technical features, and it should be understood that the embodiments presented herein are not limited by the accompanying drawings. As such, the present disclosure should be construed to extend to any alterations, equivalents, and substitutes in addition to those which are particularly set out in the accompanying drawings.

Although the terms first, second, third, and the like may be used herein to describe various elements, components, regions, layers, and/or sections, these elements, components, regions, layers, and/or sections should not be limited by these terms. These terms are generally only used to distinguish one element from another.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present.

FIG. 1 is a block diagram of an example edge learning processing system 100 in accordance with some implementations. In various implementations, the example edge learning processing system 100 or portions thereof are included in an edge device 150 (e.g., the edge device 1100 shown in FIG. 11), a controller, or a suitable combination thereof. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, in some implementations, the example edge learning processing system 100 includes at least a training server 110, a network 120, sensors 130, a controller 140, and an edge device 150. In some implementations, the training server 110 includes at least a pre-trained neural network 112 and neural network parameters. In some implementations, the sensors 130 includes at least an image sensor 132 and a microphone 134. In some implementations, the edge device 150 includes at least a memory 160, one or more processors 170, a training database 190, and an edge learning module 180.

In the example edge learning processing system 100, two different types of neural network training phases make up the edge learning process. The first phase of the neural network training is performed on the training server 110. The second phase of the neural network training is performed on an edge device 150 with one or more processors 170. The second phase neural network training utilizes the pre-trained neural network 112 at the first phase as the basic network. The systems and methods in the present disclosure are applied to the refinement of a neural network model at a transfer learning process after the edge device 150 is deployed into a locally constrained physical environment. This approach assumes that the neural network learns from the input data that are captured by an edge device deployed in a constrained physical space with a known fixed number of classes. Accordingly, the edge learning methods can be deployed into numerous types of consumer electronics and appliance that are designed to utilize artificial intelligence and machine learning techniques for their services and functions.

During the edge learning process, a part of the input data (e.g., collected by the sensors 130) is used for training and validation of the transfer learning. There are certain types of neural networks that requires the training data to be labeled. For example, a supervised learning with a CNN is an example of a neural network that requires labeling of the training data. Normally, the training data is labeled by human annotators before the training process on a training server 110 prior to an actual neural network training process. However, for edge devices such as edge device 150, it is impractical to perform the manual annotation in order to label the training data when the edge device 150 is deployed into a real-world environment. For example, during the neural network training process, it is not feasible to ask or expect a consumer of the edge device 150 to collect and label the newly acquired training data. In addition, it is not practical to enter each consumer's home in order to collect data and train the edge device 150 of the consumer. As such, the present disclosure automatically labels (or approximates) training data through an automatic labeling method after the edge device is deployed in a consumer's home.

The training server 110 serves to provide various services related to training and testing a pre-trained neural network 112 described in an implementation of the present disclosure. A training server trains the pre-trained neural network 112 prior to deploying the edge device 150 into a locally constrained physical space. A pre-trained neural network model is designed and trained based on the goal of a task. As an example, the pre-trained neural network 112 may be pre-trained on the training server 110 located at a factory and occurs before the edge devices are sent to consumers. Accordingly, the edge learning is a transfer learning approach such that a base neural network is designed for a specific function (such as image classification), and then the pre-trained and optimized base neural network is transferred to a memory 160 that the edge device 150 can access.

In some implementations, the edge device 150 may correspond to various consumer devices such as a robot, a robot cleaner, a refrigerator, a television, air conditioner, or the like. The edge devices may correspond to devices that are designed to include artificial intelligence functionality such as image processing or voice recognition. In some implementations, the edge device 150 may acquire images, videos, or audio data using the image sensor 132 or microphone 134 provided therein, may store some of the acquired images, videos, or audio data in the memory 160 of the edge device 150, and may store some of the images, videos, or audio data in a storage memory of a computer connected to a network 120 by transmitting them to the computer.

In some implementations, the processor 170 includes at least an inference module 172 and a training data control module 174. Generally, the inference module 172 uses a neural network to perform classification or regressions results and the training data control module 174 performs functions that learn from the training data and trains the neural network to handle certain tasks. In some implementations, the one or more processors 170 corresponds to one or more neuromorphic processors (NMP) that are deployed on the edge device 150. An NMP is a particular type of device that includes any electrical devices which mimics the natural biological structures of a human nervous system. The goal of an NMP is to impart cognitive abilities to a machine by implementing neuros in silicon.

In some implementations, the inference module 172 is configured to produce inference results for training and validation data. In some implementations, the inference module 172 is also configured to perform an inference consistency check in an augmented data group in order to check that the inference results of the training and validation data are consistent within the same augmented data group. The interference consistency check in an augmented data group will be described in greater detail below with respect to FIG. 4.

In some implementations, the training data control module 174 is configured to determine a size of a mini-batch of training data. Training data may be first converted to a smaller data format than the original training data in order to reduce the amount of data processing and increase the data bandwidth throughput. In some implementations, if the training data is converted and quantized during the training phase, the training data retains scaling information for each quantization.

In some implementations, the training data control module 174 is also configured to schedule initiation of the execution of the neural network for edge learning such that the actual execution of the edge learning process can be separated from the data collection process. For example, the training data can be collected during an inference phase controlled by the inference module 172, and the actual transfer learning that is controlled by the training data control module 174 can happen during a non-inference phase. As will be explained in further detail with respect to FIG. 2, executing the different processes during different phases is advantageous because this helps the edge device 150 utilize its limited hardware resources in a more efficient manner.

In some implementations, the memory 160 may correspond to a double data rate (DDR). In some implementations, the memory 160 stores at least training data, auto-labeled test and validation data, reference outputs, inference model parameters, inference output data, a copy of the binary inference model, and newly proposed model parameters.

In some implementations, the edge device 150 includes sensors 130 such as an image sensor 132 and a microphone 134 for respectively capturing input signals corresponding to visual signals and audio signals specific to an environment. In some implementations, the input data are sent to the training database 190 for access by the edge learning module 180.

The input data may be generally divided into three different groups depending on its functional use. In the first group, the input data may be used for training the neural networks at the second phase neural network training on the edge device 150. In the second group, the input data may be used for validating the output of the currently trained neural network and providing the feedbacks to the currently trained neural network in order to fine tune the model parameters on the edge device 150. In the third group, the input data may be used for testing and measuring the final performance of the newly trained neural network model and for inferencing the output of the inference neural network. In this case, the inference output is sent to one or more application functions that interpret and utilize the inference output for the intended use cases of the specific application of the edge device 150.

In some implementations, the edge learning module 180 is configured to perform data augmentation (as will be described in further detail with respect to FIG. 4), a confidence upgrade process (as will be described in further detail with respect to FIGS. 5 and 6), auto-labeling the training and validation data (as will be described in further detail with respect to FIG. 7), short-term and long-term validation (as will be described in further detail in FIGS. 8 and 9), and updating the neural network parameters. In some implementations, the edge learning module 180 will be controlled by the training data control module 174 and receive training data from the training database 190. In some implementations, the edge learning module 180 will receive inference model parameters and instructions from the memory 160 and store model parameters in the memory 160.

In some implementations, the edge learning module 180 performs an auto-labeling process that consists of multiple algorithms that approximate (or generate) the label of training data. The multiple algorithms for approximating the labels are described in further detail below with respect to FIGS. 4, 5, 6, and 7. Once the transfer learning is complete, the newly proposed parameters are then validated through a two-stage validation process (e.g., a short-term validation and a long-term validation). The goal of the short-term validation is to verify whether the newly proposed parameters actually produced better performance outputs than the previous neural network model. The goal of the long-term validation is to check whether a series of model parameter updates performed over a longer period of time caused the neural network to stray away from an acceptable edge device performance range. If the newly proposed parameters satisfy a validation threshold through the two-stage validation process, then the newly proposed parameters are updated and sent to the memory 160. If the newly proposed parameters do not satisfy the validation threshold, then the newly proposed parameters are discarded.

In some implementations, the controller 140 is configured to manage and coordinate the edge learning process for the edge device 150. In some implementations, the controller 140 includes a suitable combination of software, firmware, and/or hardware. In some implementations, the controller 140 is a computing device that is local or remote relative to the edge device 150. For example, the controller 140 may be a local server situated within the environment. In another example, the controller 140 is a remote server situated outside the environment (e.g., a cloud server, central server, etc.). In some implementations, the controller 140 is communicatively coupled with the edge device 150 via one or more wired or wireless communication channels (e.g., BLU-ETOOTH, Institute of Electrical and Electronics Engineers (IEEE) 802.11x, IEEE 802.16x, IEEE 802.3x, etc.).

In some implementations, the training server 110 and the edge device 150 is connected for communication through a network 120. The network 120 can be any suitable communication network including a wired and wireless network, for example, a local area network (LAN), a wide area network (WAN), the Internet, an intranet, an extranet, and a mobile network, for example, cellular, third generation mobile communication system (3G), long-term evolution (LTE), fifth generation mobile communication systems (5G), Wi-Fi networks, an ad hoc network, and a combination thereof.

The network 120 may include connection of network elements such as hubs, bridges, routers, switches, and gateways. The network 120 may include one or more connected networks, including a public network such as the Internet and a private network such as a secure corporate private network. For example, the network may include a multi-network environment. Access to the network 120 may be provided via one or more wired or wireless access networks.

The edge device 150 may transmit and receive data with the training server 110 through a 5G network. Specifically, the edge device 150 may perform data communication with the training server 110 using at least one service of enhanced mobile broadband (eMBB), ultra-reliable and low latency communications (URLLC), or massive machine-type communications (mMTC), through the 5G network.

eMBB is a mobile broadband service, and provides, for example, multimedia contents and wireless data access. In addition, improved mobile services such as hotspots and broadband coverage for accommodating the rapidly growing mobile traffic may be provided via eMBB. Through a hotspot, the high-volume traffic may be accommodated in an area where user mobility is low and user density is high. Through broadband coverage, a wide-range and stable wireless environment and user mobility may be guaranteed.

A URLLC service defines requirements that are far more stringent than existing LTE in terms of reliability and transmission delay of data transmission and reception, and corresponds to a 5G service for production process automation in the industrial field, telemedicine, remote surgery, transportation, safety, and the like.

mMTC is a transmission delay-insensitive service that requires a relatively small amount of data transmission. The mMTC enables a much larger number of terminals, such as sensors, than general mobile cellular phones to be simultaneously connected to a wireless access network. In this case, the communication module price of the terminal should be inexpensive, and there is a need for improved power efficiency and power saving technology capable of operating for years without battery replacement or recharging.

Although the memory 160, the processor(s) 170, the inference module 172, the training data control module 174, the training database 190, and the edge learning module 180, are shown as residing on a single edge device 150, it should be understand that in other implementations, any combination of the memory 160, the processor(s) 170, the inference module 172, the training data control module 174, the training database 190, and the edge learning module 180 may be located in separate computing devices.

As recognized by those of ordinary skill in the art, items shown separately could be combined and some items could be separated. For example, some modules shown separately in FIG. 1 could be implemented in a single module and the various functions of single module could be implemented by one or more modules in various implementations. The actual number of modules and the division of particular functions and how features are allocated among them will vary from one implementation to another and, in some implementations, depends in part on the particular combination of hardware, software, and/or firmware chosen for a particular implementation, as will be understood by those of ordinary skill in the art.

With reference to the training data for neural networks discussed herein, and by way of background, a neural network, otherwise referred to as an artificial neural network (ANN), is a data processing system modelled after the mechanism of biological neurons and interneuron connections, in which a number of neurons, referred to as nodes or processing elements, are interconnected in layers. The neural networks may refer generally to models that have artificial neurons (nodes) forming a network through synaptic interconnections, and acquire problem-solving capability as the strengths of synaptic interconnections are adjusted throughout training. Various types of ANNs exist, including convolutional neural networks (CNN) utilized generally for image recognition processes. The terms 'artificial neural network' and 'neural network' may be used interchangeably herein.

An ANN, may include a number of layers, each including a number of neurons. In addition, the ANN may include synapses that connect the neurons to one another. Thus, ANNs may be defined by the following three factors: (1) a connection pattern between neurons on different layers; (2) a learning process that updates synaptic weights; and (3) an activation function generating an output value from a weighted sum of inputs received from a lower layer. ANNs may also include, but are not limited to, network models such as a deep neural network (DNN), a recurrent neural network (RNN), a bidirectional recurrent deep neural network (BRDNN), and a multilayer perception (MLP).

An ANN may be classified as a single-layer neural network or a multi-layer neural network, based on the number of layers therein. A general single-layer neural network is composed of an input layer and an output layer. In addition, a general multi-layer neural network is composed of an input layer, one or more hidden layers, and an output layer.

The input layer receives data from an external source, and the number of neurons in the input layer is identical to the number of input variables. The hidden layer is located between the input layer and the output layer, and receives signals from the input layer, extracts features, and feeds the extracted features to the output layer. The output layer receives a signal from the hidden layer and outputs an output value based on the received signal. Input signals between the neurons are summed together after being multiplied by corresponding connection strengths (synaptic weights), and if this sum exceeds a threshold value of a corresponding neuron, the neuron can be activated and output an output value obtained through an activation function.

Meanwhile, a deep neural network with a plurality of hidden layers between the input layer and the output layer may be the most representative type of artificial neural network which enables deep learning, which is one machine learning technique.

A neural network can be trained using training data. Here, the training may refer to the process of determining parameters of the artificial neural network by using the training data, to perform tasks such as classification, regression analysis, and clustering of inputted data. Such parameters of the artificial neural network may include synaptic weights and biases applied to neurons. A neural network trained using training data can classify inputted data according to a pattern within the inputted data.

Throughout the present specification, a neural network such as a CNN trained using training data may be referred to as a trained model. Hereinbelow, learning paradigms of a neural network will be described in detail.

Learning paradigms of a neural network may be classified into supervised learning, unsupervised learning, semi-supervised learning, and reinforcement learning.

Supervised learning is a machine learning method that derives a single function from the training data. Among the functions that may be thus derived, a function that outputs a continuous range of values may be referred to as a regressor, and a function that predicts and outputs the class of an input vector may be referred to as a classifier. In supervised learning, a CNN can be trained with training data that has been given a label. Here, the label may refer to a target answer (or a result value) to be guessed by the artificial neural network when the training data is inputted to the artificial neural network. Throughout the present specification, the target answer (or a result value) to be guessed by the CNN when the training data is inputted may be referred to as a label or labeling data.

In addition, throughout the present specification, assigning one or more labels to training data in order to train a CNN may be referred to as labeling the training data with labeling data. Training data and labels corresponding to the training data together may form a single training set, and as such, they may be inputted to an artificial neural network as a training set. Meanwhile, the training data may exhibit a number of features, and the training data being labeled with the labels may be interpreted as the features exhibited by the training data being labeled with the labels. In this case, the training data may represent a feature of an input object as a vector. Using training data and labeling data together, the CNN may derive a correlation function between the training data and the labeling data. Then, through evaluation of the function derived from the neural network, a parameter of the neural network may be determined (e.g., or optimized).

Unsupervised learning is a machine learning method that learns from training data that has not been given a label. More specifically, unsupervised learning may be a training scheme that trains a neural network to discover a pattern within given training data and perform classification by using the discovered pattern, rather than by using a correlation between given training data and labels corresponding to the given training data. Examples of unsupervised learning include, but are not limited to, clustering and independent component analysis.

Semi-supervised learning is machine learning method that makes use of both labeled training data and unlabeled training data. One semi-supervised learning technique involves reasoning the label of unlabeled training data, and then using this reasoned label for learning. This technique may be used advantageously when the cost associated with the labeling process is high.

Reinforcement learning may be based on a theory that given the condition under which a reinforcement learning agent can determine what action to choose at each time instance, the agent can find an optimal path to a solution solely based on experience without reference to data. Reinforcement learning may be performed mainly through a Markov decision process (MDP). The Markov Decision Process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

A neural network is characterized by features of its model, the features including an activation function, a loss function or cost function, a learning algorithm, an optimization algorithm, and so forth. Also, the hyperparameters are set before learning, and model parameters can be set through learning to specify the architecture of the artificial neural network. For instance, the structure of a neural network may be determined by a number of factors, including the number of hidden layers, the number of hidden nodes included in each hidden layer, input feature vectors, target feature vectors, and so forth.

In general, a neural network is first trained by experimentally setting hyperparameters to various values, and based on the results of training, the hyperparameters can be set to optimal values that provide a stable learning rate and accuracy. Hyperparameters may include various parameters which need to be initially set for learning, much like the initial values of model parameters. Also, the model parameters may include various parameters sought to be determined through learning. For instance, the hyperparameters may include initial values of weights and biases between nodes, mini-batch size, iteration number, learning rate, and so forth. Furthermore, the model parameters may include a weight between nodes, a bias between nodes, and so forth.

Loss function may be used as an index (reference) in determining an optimal model parameter during the learning process of an artificial neural network. Learning in the neural network involves a process of adjusting model parameters so as to reduce the loss function, and the purpose of learning may be to determine the model parameters that minimize the loss function. Loss functions typically use means squared error (MSE) or cross entropy error (CEE), but the present disclosure is not limited thereto.

Cross-entropy error may be used when a true label is one-hot encoded. One-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be deployed to minimize a cost function, and examples of such learning optimization algorithms include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the output of a cost function by using a current slope of the cost function. The direction in which the model parameters are to be adjusted may be referred to as a step direction, and a size by which the model parameters are to be adjusted may be referred to as a step size. Here, the step size may mean a learning rate. GD obtains a slope of the cost function through use of partial differential equations, using each of model parameters, and updates the model parameters by adjusting the model parameters by a learning rate in the direction of the slope.

SGD may include a method that separates the training dataset into mini batches, and by performing gradient descent for each of these mini batches, increases the frequency of gradient descent.

Adagrad, AdaDelta and RMSProp may include methods that increase optimization accuracy in SGD by adjusting the step size, and may also include methods that increase optimization accuracy in SGD by adjusting the momentum and step direction. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an artificial neural network rely not only on the structure and learning optimization algorithms of the artificial neural network but also on the hyperparameters thereof. Therefore, in order to obtain a good learning model, it is important to choose a proper structure and learning algorithms for the artificial neural network, but also to choose proper hyperparameters.

Figure 2:
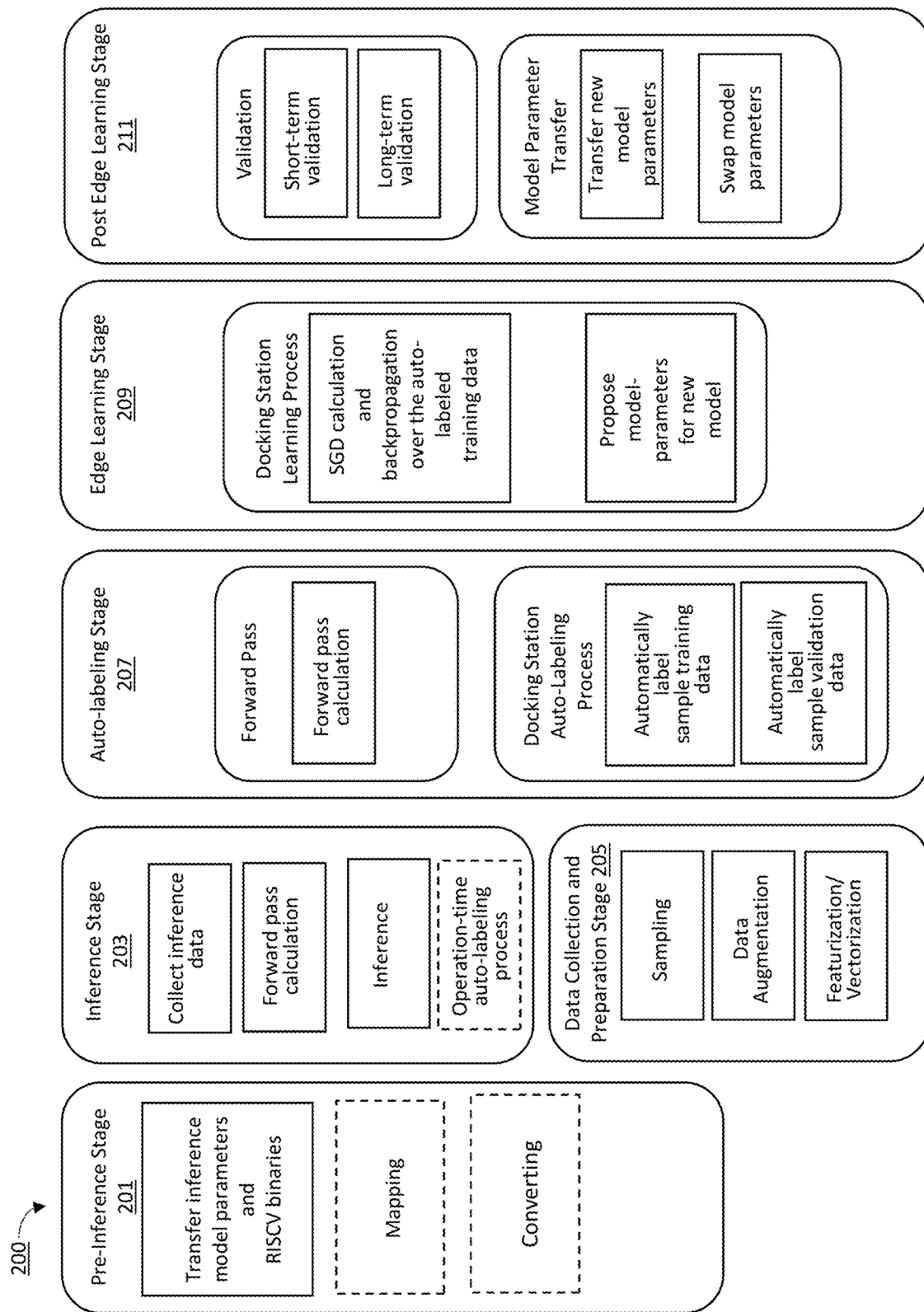
FIG. 2 is a block diagram showing edge learning tasks at different stages in accordance with some implementations.

FIG. 2 is a block diagram showing edge learning tasks at different stages in accordance with some implementations. Those skilled in the art will appreciate that the simplified block diagram 200 includes merely the basic information to illustrate the major components of the overall edge learning process that will be described in other sections. So while certain specific features are illustrated, those skilled in the art will appreciate from the present disclosure that various other features have not been illustrated for the sake of brevity and so as not to obscure more pertinent aspects of the simplified block diagram 200 as they are used to describe more prominent features of the various embodiments disclosed above. Nevertheless, those skilled in the art would appreciate the interaction between the different stages of edge learning tasks.

The main inference neural network is designed and trained to support machine learning. For example, a CNN (e.g., example convolutional neural network 1000 described in FIG. 11) can be designed for an image classification task for a predefined set of classes with training image data. In some implementations, a popular deep learning software framework is used to produce the neural network parameter file and description files. Known deep learning software frameworks can be used to implement the pre-trained neural network (e.g., the pre-trained neural network 112 shown in FIG. 1) including Caffe, TensorFlow, or Keras. The deep learning software framework is also used to train the network based on the pre-acquired training data. In some implementations, a controller (e.g., the controller 140 shown in FIG. 1) may oversee the process of the edge learning tasks at different stages.

During a pre-inference stage 201, a training server (e.g., the training server 110 shown in FIG. 1) transfers inference model parameters and instructions for the RIS CV binaries (such as data partitioning) to the edge device (e.g., the edge device 150 shown in FIG. 1). Depending on the configuration, the data can be converted to a quantized data type, and the neural network function calls can be mapped to edge device recognizable instructions.

In some implementations where the processor (e.g., the processor 170 shown in FIG. 1) corresponds to an NMP, during the pre-inference stage, files are passed to a converter module that converts a conventional neural network into an NMP network that the edge device can recognize. The converter analyzes and adjusts optimal precision of the model parameter values. Depending on the execution scenario, the model parameter values may also be quantized for faster interfacing. Finally, the NMP network is compressed and an inference file is generated based on the NMP recognizable network.

Following the example above where the processor corresponds to an NMP, during the pre-inference stage, a mapper parses the interface file and maps the NMP recognizable network descriptions to a set of function calls that can run on the NMP. The set of mapped function calls generate a binary executable that is linked to the shared libraries in a memory storage (e.g., the memory 160 shown in FIG. 1) on the edge device. The mapper also generates a scenario for memory control. The shared libraries may consist of one or more hardware-specific primitive application programming interfaces (APIs), mathematical function APIs, and neural network layer APIs. Then, the NMP loads the runtime code and executes the classification task for a given input data.

During an inference stage 203, the edge learning processing system (e.g., the example edge learning processing system 100 shown in FIG. 1) collects data and performs a forward calculation for the inference. In some implementations, the forward pass calculation can also be performed for both inference and auto-labeling purposes. If the inference is performed for the auto-labeling, the inference output data is kept and transferred to the auto-labeling process in order to provide label candidates for the separately assigned data during edge training.

In some implementations, during the inference stage 203, the auto-labeling may be performed during an operation of the edge device. However, performing operation-time auto-labeling is not usually recommended because the edge device will be forced to share the hardware resources with the inference process. These parallel processes may over-burden the hardware resources and bandwidth.

During a data collection and preparation stage 205, a controller (e.g., the controller 140 shown in FIG. 1) collects and stores training and validation data in parallel with the inference process. Depending on the configuration, the training and validation data is sampled and organized into mini-batches of data sets. A data sampling step indicates that not all of the input data collected will be used for either training or validation. As such, a subset of the newly acquired input data that pass a sampling criteria will be sampled for training and validation.

At the sampling step, in some implementations, the edge learning processing system performs sampling by utilizing a dedicated neural network for sampling. In some implementations, the dedicated training and validation data sampling network is a simpler and smaller neural network than the main inference neural network. The purpose of the additional training and validation data sampling network is to control the quality of the input data for the subsequent auto-labeling tasks.

At the data augmentation step, the edge learning processing system augments each of the sampled training and validation data for two main purposes. The first purpose is to increase the training data size with a variation of the original training data. The second purpose is to provide a group of training data that will be used during the validation stage. A principal assumption of using the groups of augmented data is based on the fact that the augmented data in the group that is augmented from a source data should have the same label as the source data. Therefore, the edge learning processing system 100 can confidently compare the inference output for the augmented data in the same group as the source data with the inference output of the source data and verify whether the data in this augmented data group includes the same label or not. This comparison will help determine whether the inference result is correct or not based on whether any inference output is different from the others in the same group.

At the featurization/vectorization step, the edge learning module 180 transforms the training data into feature vectors that are used in the neural network as input vectors. Any other pre-processing that may increase the training data quality can also be performed during this stage. The data format of the training data can also be changed depending on the configuration of the neural network. If any quantization is needed, the data can be converted into another data type.

During the auto-labeling stage 207, the edge learning processing system 100 performs a forward pass calculation to perform auto-labeling. Performing auto-labeling during the operation of the edge device is not recommended because the auto-labeling process will share hardware resources with the primary inference process of the edge device. These two parallel processes will over-burden the hardware resource and bandwidth. Accordingly, the auto-labeling process is usually performed when the edge device 150 is in a dock station in a docking station mode and not performing its own primary inference task in order to utilize the hardware resources in a more efficient manner and to not increase the risk of data transfer bottlenecks.

During the edge learning stage 209, the edge learning module 180 utilizes auto-labeled training data from the previous stage (e.g., auto-labeling stage 207). Here, the edge learning processing system 100 performs an SGD calculation and backpropagation over the auto-labeled training data in order to learn a set of new model parameters. This allows the edge learning processing system 100 to propose a new set of model parameters as potential updates the edge learning processing system 100.

During the post edge learning stage 211, the edge learning module 180 validates the new set of model parameters with sampled validation data. Specifically, the edge learning processing system 100 validates the newly proposed model parameter candidates through a short-term validation step and a long-term validation step. As explained above, the goal of the short-term validation process is to verify whether the newly proposed model parameters proposed by the edge learning module (e.g., the edge learning module 180 shown in FIG. 1) actually produce a better performance by comparing the output of the previous neural network model with an output of the new neural network model with the proposed model parameters. The goal of the long-term validation process is to check whether a series of model updates performed over time period may diverge from the originally intended boundary of the performance limits. Another goal of the long-term validation process is to verify that the long-term update did not cause the neural network model to stray away from an acceptable edge device performance range that can be preset by a training server (e.g., the training server 110 shown in FIG. 1).

At the validation step, the edge learning processing system validates the proposed model parameters with a short-term validation process. The short-term validation process will be explained in further detail with respect to FIG. 9. Based on the short-term validation process, the edge learning processing system determines whether to update the inference neural network with the newly learned model parameters or not. If the final decision is to update the inference neural network, the edge learning module 180 transfers newly learned model parameters to the memory 160 in order to replace the pre-existing model parameters. If the final decision is not to update the inference neural network, the edge learning module 180 ignores the newly proposed model parameters, and the edge device 150 goes back to the pre-inference stage 201.

After a series of neural network model parameter updates that are based on using automatically labeled training and validation data, the series of neural network parameter updates may create a divergence from the original performance goals of the neural network to be higher than originally intended by the neural network design. Thus, the divergence raises the risk of overfitting the neural network higher than a predefined boundary even when a validation of the newly proposed neural network updates is performed at every network update step. This is especially true when the edge device is deployed in a specific real-world environment and the variation of the newly captured input data is limited to the unique situations of the specific real-world environment. In other words, from a global perspective, a series of local validations may not guarantee that the performance convergence of the neural network in a long run. Therefore, it is necessary to perform a long-term validation of the neural network after a predefined interval that captures a series of model parameter updates.

At the validation step, the edge learning processing system validates the proposed model parameters with a long-term validation process. The long-term validation process will be explained in further detail with respect to FIG. 9. The edge learning module performs the long-term validation process after a pre-defined time period in order to check whether a series of updated model parameters caused the neural network to diverge from a pre-defined boundary of the neural network performance. In some implementations, the original network performance boundary can be set heuristically. In some implementations, the network performance boundaries can be updated over a computer network (e.g., the network 120 shown in FIG. 1). For example, the network performance boundaries can be optimized in a factory and distributed through a cloud network if the owner of the edge device 150 opts in to update the neural network during regular maintenance periods or following a consumer support service schedule. In some implementations, the edge device may also recommend a periodic update for the network performance boundaries during the long-term validation process.

At the model parameter transfer step, the edge learning module 180 transfers the newly proposed model parameter candidates if the newly proposed model parameter candidates satisfy validation using the short-term and long-term validation process. In some implementations, the edge learning module 180 swaps the newly proposed model parameter candidates to a factory model parameter or updates the model parameters with a new set of factory trained model parameters from an update site if the newly proposed model parameter candidates fail to satisfy validation by the long-term validation process. This will be explained in further with respect to FIG. 9.

Figure 3:
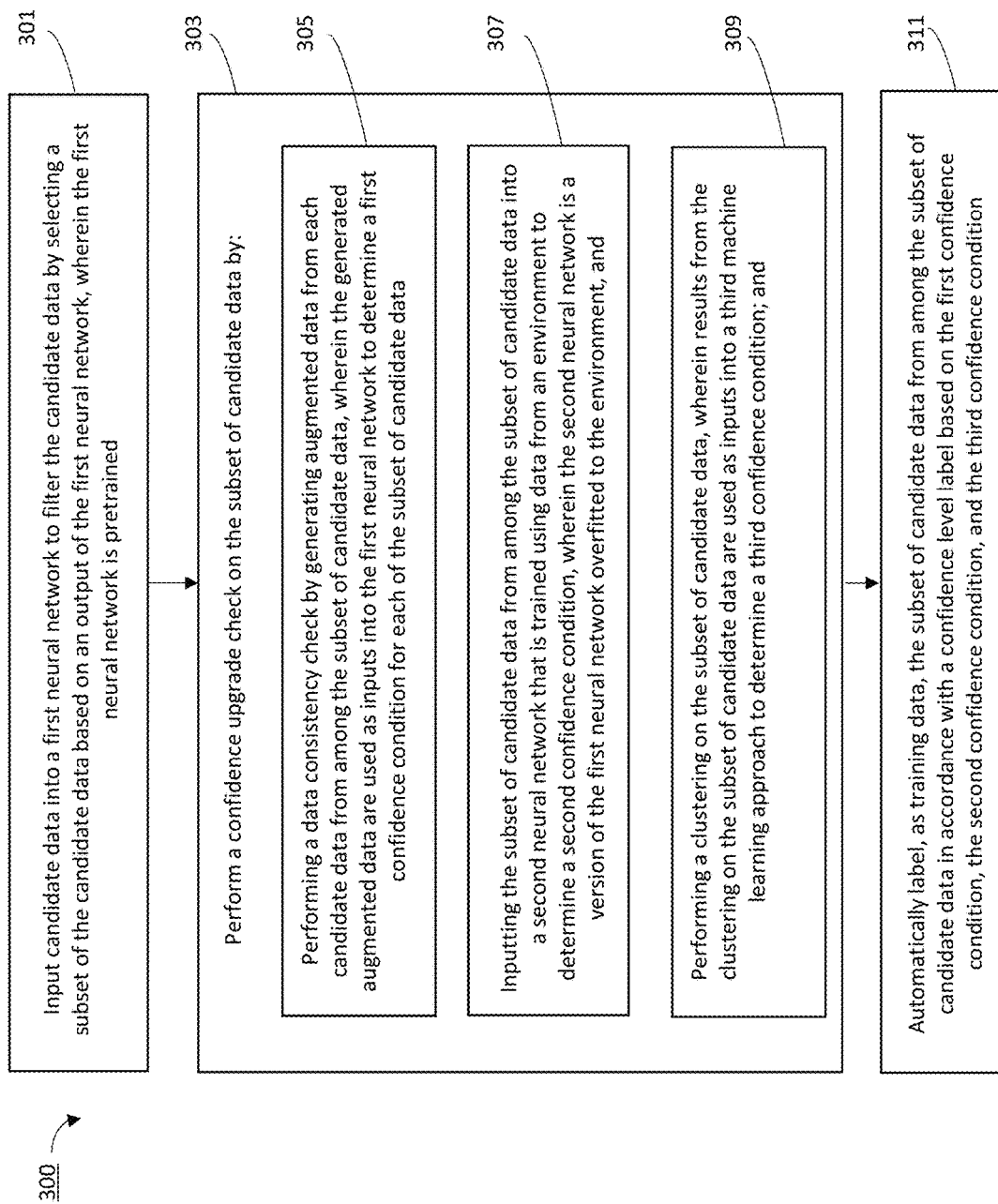
FIG. 3 is a flowchart representation of a method of automatically labeling training and validation data in accordance with some implementations.

FIG. 3 is a flowchart representation of a method of automatically labeling training and validation data in accordance with some implementations. In some implementations, the method 300 is performed by a device with one or more processors and non-transitory memory such as the edge device 150 shown in FIG. 1. In some implementations, the method 300 is implemented as a set of computer readable instructions that are executed at a device. Briefly, the method 300 includes: inputting candidate data into a first neural network to filter out candidate data by selecting a subset of candidate data based on an output of the first neural network, performing a confidence upgrade check on the subset of data, and automatically labeling the subset of candidate data in accordance with a confidence level label.

To that end, as represented by block 301, in some implementations, the method 300 includes inputting candidate data into a first neural network to filter the candidate data by selecting a subset of the candidate data based on an output of the first neural network, wherein the first neural network (e.g., the pre-trained neural network 112 shown in FIG. 1) is pre-trained. In some implementations, the candidate data corresponds to newly acquired data captured by sensors (e.g., the image sensor 132 or microphone 134 shown in FIG. 1) on a device, wherein the newly acquired data corresponds to visual or audio data specific to the environment. In some implementations, the first neural network is based on a simplified version of a base neural network model (e.g., the pre-trained neural network 112).

As represented by block 303, in some implementations, the method 300 includes performing a confidence upgrade check on the subset of candidate data.

As represented by block 305, performing a data consistency check by generating augmented data from each candidate data from among the subset of candidate data, wherein the generated augmented data are used as inputs into the first neural network to determine a first confidence condition for each of the subset of candidate data. In some implementations, the method 300 further includes: assigning a group identification to the augmented data, wherein the group identification indicates a source for the generated augmented data; comparing a candidate label with other candidate labels in an augmented data group with a same group identification, and increasing a weight of the first confidence condition based on a confidence of the candidate label when the candidate label is consistent with the other candidate labels in the augmented data group with the same group identification. In some implementations, the augmented data is created by at least one of shifting, scaling, translating, or rotating an image from the subset of candidate data. A more detailed example of performing the data consistency check by generating augmented data is described below with reference to the flowchart illustrated in FIG. 4.

As represented by block 307, inputting the subset of candidate data from among the subset of candidate data into a second neural network that is trained using data from an environment to determine a second confidence condition, wherein the second neural network is a version of the first neural network overfitted to the environment. A more detailed example of inputting the subset of candidate data into a second neural network is described below with reference to the flowchart illustrated in FIG. 5B.

As represented by block 309, performing a clustering on the subset of candidate data, wherein results from the clustering on the subset of candidate data are used as inputs into a third machine learning approach to determine a third confidence condition. In some implementations, the clustering includes a known fixed number of clusters with known reference points. In some implementations, the clustering is based on comparing distance measurements for the subset of candidate data with known reference points and measuring similarities between the distance measurements in order to form clusters. A more detailed example of performing a clustering on the subset of candidate data is described below with reference to the flowchart illustrated in FIG. 6.

As represented by block 311, automatically labeling, as training data, the subset of candidate data from among the subset of candidate data in accordance with a confidence level label based on the first confidence condition, the second confidence condition, and the third confidence condition. In some implementations, the first confidence condition is based on results from an inference result consistency check, second confidence condition corresponds to a weighted sum of an output from the second neural network (e.g., the slightly overfitted neural network), and the third confidence condition corresponds to an output from the third machine learning approach (e.g., a variation of the k-means clustering based on unsupervised learning). In some implementations, the automatically labeled subset of candidate data is differentiated into automatically-labeled training data and automatically-labeled validation data. A more detailed example of automatically labeling the subset of candidate data is described below with reference to the flowchart illustrated in FIG. 7.

Figure 4:
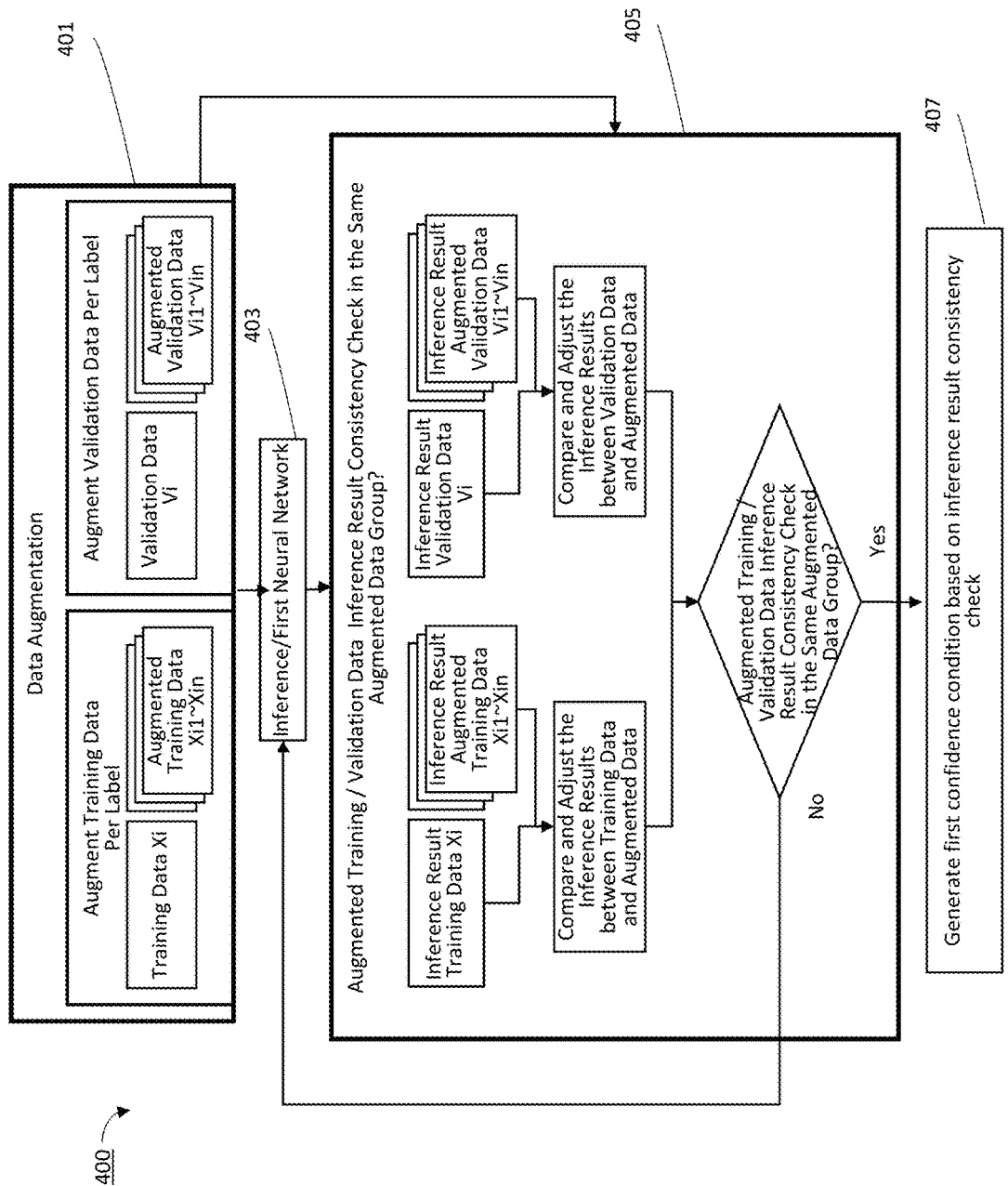
FIG. 4 is a flowchart representation of performing an inference result consistency check in an augmented data group in accordance with some implementations.

FIG. 4 is a flowchart representation of performing an inference result consistency check 400 in an augmented data group in accordance with some implementations. While certain specific features are illustrated, those skilled in the art will appreciate that from the present disclosure that various other features have not been illustrated for the sake of brevity, and so as not to obscure more pertinent aspects of the implementations disclosed herein. In some implementations, the inference result consistency check 400 is performed on the edge learning module 180 on the edge device 150. In some implementations, the inference result consistency check 400 provide a first confidence condition in a confidence upgrade criterion that is used for the auto-labeling task.

As shown by block 401, the inference module 172 (e.g., the inference module 172 shown in FIG. 1) augments each of the training data and validation data to increase the training size. In some implementations, the inference module 172 performs the augmentation step after sampling the training data and validation data. In some implementations, the inference module 172 increase training size by generating different 2D array values of an augmented image from a training image by taking the original training image and performing a shifting, scaling, translating, or rotating, or the like on the original training image to determine a different 2D array of values. In some implementations, the inference module 172 assigns a group identification (group ID) to the augmented data such that the group ID indicates which source data the augmented data is derived from. In some implementations, a predefined threshold value is used to decide whether a top result from a Softmax output of an input image is the candidate for the approximated label of the input or not.

As a non-limiting example, the inference module performs augmentation by taking an original training image and shifting, scaling, translating, or rotating the original training image to create 10 augmented images. Even though these 10 augmented images are different, the edge device 150 (e.g., the edge device 150) should be able to confidently label these 10 augmented images with the same label because those 10 augmented images are derived from the same label. Accordingly, if one or two of the labels from the 10 augmented images are labeled incorrectly, then the edge learning device knows that something is wrong. The principal behind performing an inference result consistency check in an augmented data group is that data points with the same label should be close to each other in a data distribution. As such, this assumption should be true when checking inference results for class labels among the same augmented data group.

As shown by block 403, the inference module includes inputting the augmented candidate labeled training and validation data into a first neural network to determine a first confidence condition for each of the subset of training and validation data. In some implementations, the inference module includes inputting the augmented candidate labeled training and validation data into a separate neural network (e.g., with a different design and training than the first neural network, but for the same task) to determine a first confidence condition for each of the subsets of training and validation data.

As shown by block 405, the inference module 172 checks the consistency of the labels by comparing candidate labels with the other candidate labels in the augmented data group with the same group ID. If the inference module 172 determines that the candidate label of the input data is consistent with the other labels in the same group, then, as shown by block 407, the inference module 172 generates a first confidence condition based on the inference result consistency check. The first confidence condition will be combined with a second confidence condition and a third confidence condition in order to determine whether results from the three confidence upgrade techniques (e.g., data augmentation, slightly overfitted neural network, clustering) pass a confidence upgrade criterion that is confident enough to use the approximated label.

In some implementations, the inference module 172 stores the auto-labeled training and validation data with labels in memory 160 (e.g., the memory 160 shown in FIG. 1). In some implementations, storing the auto-labeled training and validation data with labels further comprises weighting the candidate label confidence label and upgraded the label through a confidence upgrade criterion. In some implementations, weighting the candidate label confidence is performed by increasing a weight of a first confidence condition based on a confidence of the candidate label when the candidate label is consistent with the other candidate labels in the augmented data group with the same group ID.

If the inference module 172 determines that the candidate label of the input data is not consistent with the other labels in the same group, then, as shown by block 403, the inference module 172 inputs the inference results between the training/validation data and the augmented data back into the first neural network (e.g., pre-trained neural network 112 shown in FIG. 1).

The inference module 172 repeats the inference result consistency check 400 for each data in the augmented training data in the augmented validation data such that a confidence upgrade label is automatically assigned to each of the corresponding training and validation data.

Figure 5A:
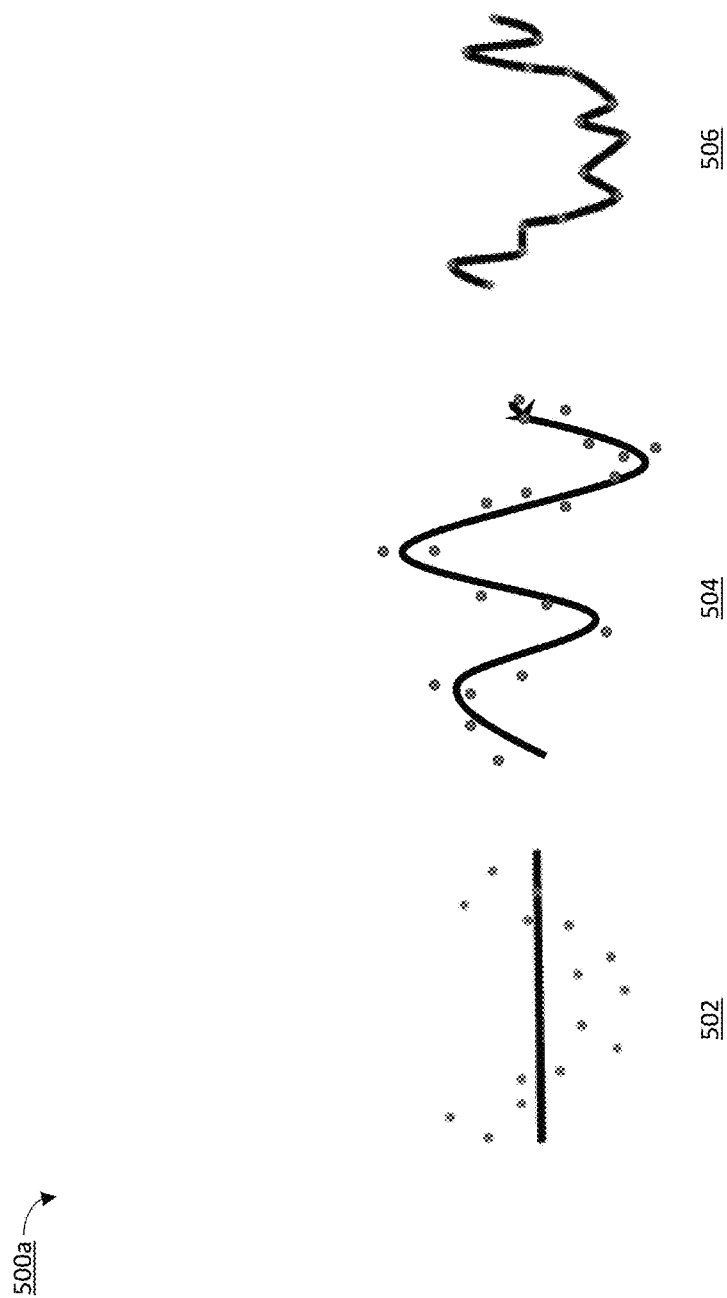
FIG. 5A is a diagram illustrating different types of neural network fitting in accordance with some implementations

FIG. 5A is a diagram illustrating different types of neural network fitting in accordance with some implementations. While certain specific features are illustrated, those skilled in the art will appreciate that from the present disclosure that various other features have not been illustrated for the sake of brevity, and so as not to obscure more pertinent aspects of the implementations disclosed herein. FIG. 5A is a simplified diagram 500a illustrating the relationship between underfitting 502, slightly overfitting 504, and overfitting 506.

Underfitting 502 refers to a model that cannot model training data nor generalize to new data. A model is underfitting when the metrics given for the training data are poor, meaning that the training accuracy of the model is low and/or the training loss is high. If a model is underfitting then the model is unable to classify data it was trained on. Thus, it is likely to perform poorly at predicting data that it has not seen before.

Overfitting 506 refers to a model that models the training data too well. Overfitting happens when a model learns the detail and the noise in the training data to the extent that it negatively impacts the performance of the model on new data. This means that the noise and random fluctuations in the training data are picked up and learned as concepts by the model.

In general, overfitting 506 is considered a feature that is typically avoided in machine learning because an overfitted neural network does not generalize to random input vectors. Instead of learning the general distribution of data, the model learns the expected output for every data point. As such, the overfitted neural network cannot be used for random input data in a general problem domain.

The edge device 150 takes advantage of a slightly overfitted 504 neural network in order to intentionally induce a biased neural network to approximate the labels of training and validation data. The goal of slightly overfitted neural network is to have a locally biased inference neural network on each edge device in a specific region after a series of neural network model parameter updates. This means that a neural network on an edge device in a specific region will behave differently from another neural network on other edge devices even though the edge devices are optimized at a factory with the same neural network.

For an edge device 150 that handles a neural network-based image classification problem, there is a much higher chance for input images inside a consumer's house to be similar to each other over a period of time of operating the edge device because the edge device 150 operates in the same environment repeatedly. When the edge device is deployed in the consumer's home, the edge device can handle a slight overfitting because the edge device is already placed in a physically constraint environment (e.g., the consumer's home). As such, when the robot vacuum continues to operate and clean the consumer's home, the robot vacuum will see the same objects repeatedly which causes the robot to feedback approximated label data in a feedback process that will naturally bias the neural network on the robot vacuum. This slightly overfitted neural network allows the robot vacuum to better learn a user's specific home (i.e., the furniture, people, or the like specific to the environment). Thus, the variation of the input images and the feature vectors will be reduced. This is particularly true when the neural network model is designed and intended to be used for a fixed number of predefined and known classes. In other words, a generalization of the neural network performance is not a strong goal of the system—instead, a slightly overfitted performance in a constrained physical space is expected and allowed.

Figure 5B:
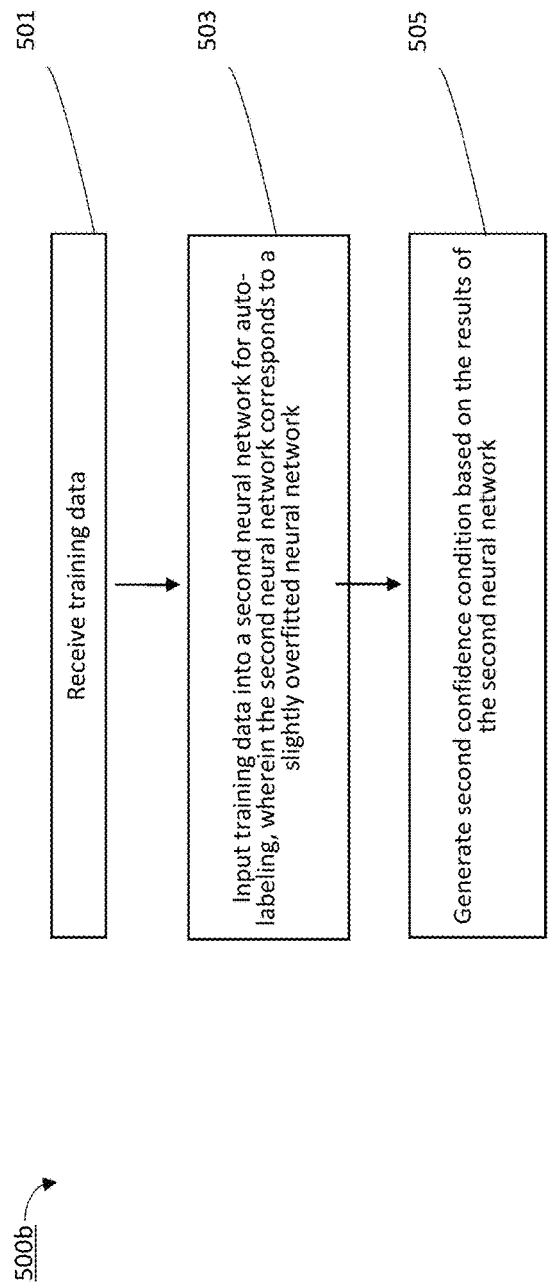
FIG. 5B is a flowchart representation of using pre-trained neural networks to perform a confidence upgrade using a slightly overfitted neural network in accordance with some implementations.

FIG. 5B is a flowchart representation of using pre-trained neural networks to perform a confidence upgrade using a slightly overfitted neural network in accordance with some implementations. While certain specific features are illustrated, those skilled in the art will appreciate that from the present disclosure that various other features have not been illustrated for the sake of brevity, and so as not to obscure more pertinent aspects of the implementations disclosed herein. In some implementations, the slightly-overfitted neural network process 500b is performed on the edge learning module 180 on the edge device 150. As an initial matter, a neural network is pre-trained (e.g., the pre-trained neural network 112 shown in FIG. 1) for performing confidence upgrade. There are multiple methods to design and train the neural network in order to perform a confidence model. In some implementations, the slightly-overfitted characteristics of a neural network provide a second confidence condition in a confidence upgrade criteria that is used for the auto-labeling task.

As a non-limiting example, at the factory, the edge devices may have the same pre-trained neural network programmed on the edge device 150. Here, the pre-trained neural network on the edge device 150 (e.g., the edge device 150 shown in FIG. 1) is optimized to avoid overfitting (e.g., overfitting 506 shown in FIG. 5A) the neural network. However, once the edge device 150 is shipped out and deployed in a consumer's home, the need for the generalization becomes weaker and the need for the edge device 150 and its neural network to adapt to the specific physical space becomes greater.

As shown by block 501, the slightly overfitted neural network process includes receiving training data from a training database 190. As an example, training data is collected while the robot cleaner operates, but training is not performed while the robot cleaner operates. Instead, the robot cleaner simply captures images and saves frames in a memory space. As mentioned in FIG. 2, the edge device 150 initiates the transfer learning process while the robot cleaner is docked in order to efficiently utilize its hardware resources.

As shown by block 503, the edge device 150 inputs training data into a second neural network for auto-labeling, wherein the second neural network corresponds to a slightly overfitted neural network model. In some implementations, the slightly overfitted neural network utilizes a copy of the same inference neural network model as the pre-trained neural network (e.g., pre-trained neural network 112 shown in FIG. 1) to generate the slightly overfitted neural network by relaxing parameters such that the requirements of non overfitting are relaxed. Accordingly, the edge device 150 utilizes the slightly overfitting neural network in order to cause the neural network to adapt and become bias for a limited input data. As mentioned above in the robot vacuum example, utilizing a slightly overfitting process is acceptable because the number of classes is known and fixed for the neural network and because the variation of the input data is less than the general cases because the input training and validation data are captured in the same physical space. In addition, the edge device 150 also attempts to regulate a degree of the overfitting process based on a predefined value so that the neural network does not lose the generalization aspects all at once. The goal is to gradually allow the overfitting of the neural network on a small scale with a small portion by the predefined degree.

As shown by block 505, the edge device 150 generates a second confidence condition based on the results from the second neural network. The second confidence condition will be combined with the first confidence condition and the third confidence condition in order to determine whether results from the three confidence upgrade techniques (e.g., data augmentation, slightly overfitted neural network, clustering) pass a confidence upgrade criterion that is confident enough to use approximated labels.

Figure 6:
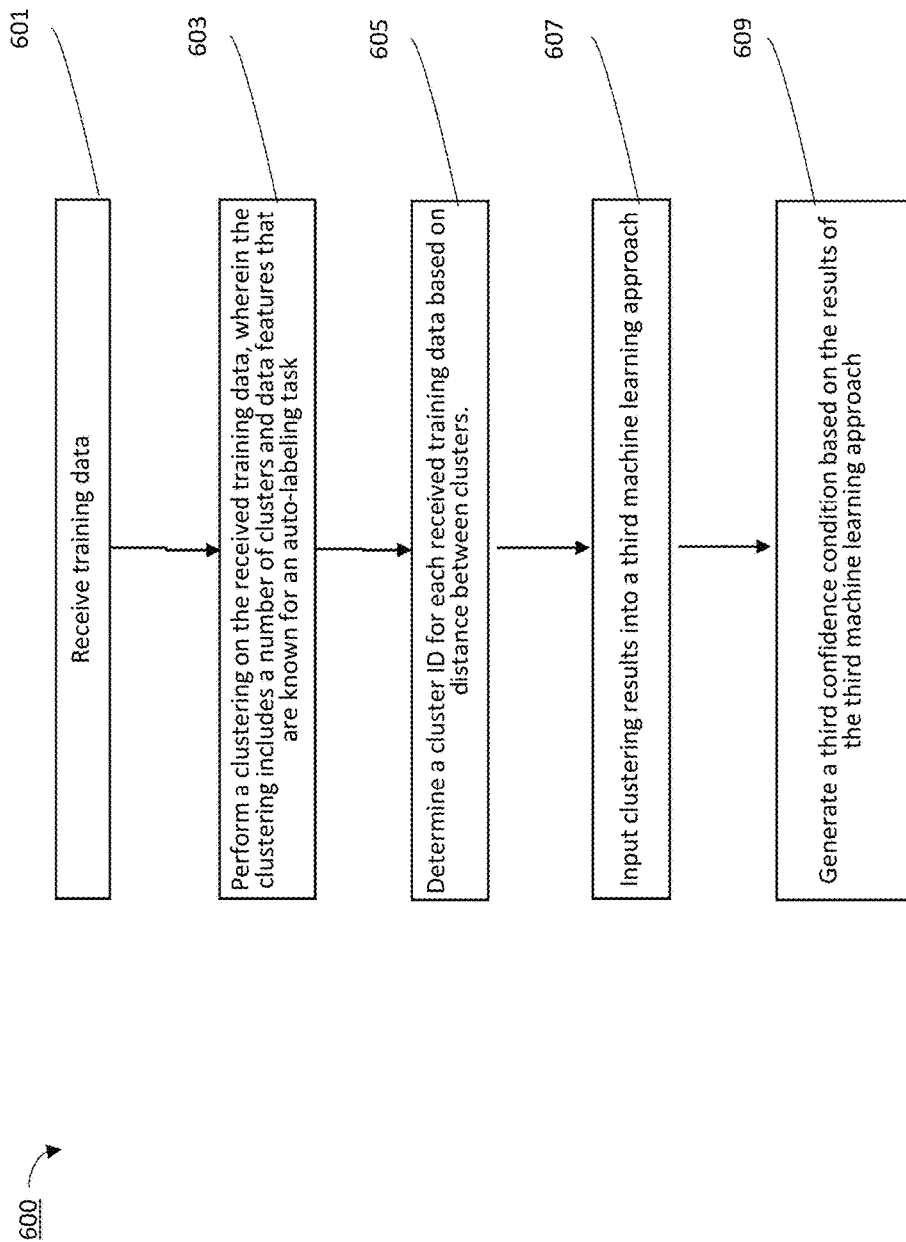
FIG. 6 is a flowchart representation of using pre-trained neural networks to perform a confidence upgrade using a clustering approach in accordance with some implementations.

In some implementations, the confidence upgrade process using a slightly overfitted neural network process may be formalized as follows:

$$y_i = M(x_i)$$

$$y_i' = M_k'(x_i)$$

$$C_i(x_i) = y_i + w'(y_i'), \{c_{i,j}=1: \text{if } c_{i,j}>1, c_{i,j}=0: \text{if } c_{i,j}<0, c_{i,j} \in C_i(x_i)\} \quad (2)$$

where the terms to this equation are defined as follows:
$x_i$: ith input vector, $x_i \in X_s$
M: a pre-trained base neural network model for inference
$M_k'$: a slightly overfitted neural network model under the constraints k
$y_i$: Softmax output for input $x_i$ by the pre-trained base neural network model M
$y_i'$: Softmax output for input $x_i$ by the overfitted neural network model $M_k'$
w': weight for the output of overfitted neural network
$C_i(x_i)$: output of confidence upgrade for input $x_i$
$c_{i,j}$: jth scalar value, $c_{i,j} \in C_i(x_i)$ FIG. 6 is a flowchart representation of using pre-trained neural networks to perform a confidence upgrade using a clustering approach in accordance with some implementations. While certain specific features are illustrated, those skilled in the art will appreciate that from the present disclosure that various other features have not been illustrated for the sake of brevity, and so as not to obscure more pertinent aspects of the implementations disclosed herein. In some implementations, the clustering approach 600 is performed on the edge learning module 180 on the edge device 150.

The present disclosure utilizes a clustering approach 600 that is similar to a K-means clustering algorithm in order to provide a third confidence condition in the confidence upgrade criteria used for the auto-labeling task. The variation of K-means clustering is referred to as L-means clustering. The K-means clustering algorithm is an iterative algorithm that tries to partition the dataset into K pre-defined distinct non-overlapping clusters where each data points belongs to only one group. The K-means clustering algorithm aims to find and group in classes the data points that have a high similarity between them such that data points in the same cluster (or subgroup) are similar while data points in different clusters are different. It assigns data points to a cluster such that the sum of the squared distance between the data points and the cluster's centroid (arithmetic mean of the data points that belong to that cluster) is at the minimum.

However, unlike traditional K-means clustering algorithms, the edge device 150 implements a clustering algorithm with a known k number such that the edge device 150 starts with a base model that is aware of the data (scatter plot) for each of the data. The scatter plot of the pre-defined reference points for each cluster is initially guided by the predefined set of training data. Accordingly, the L-means clustering is based on an unsupervised learning approach in a sense that this variation of the traditional K-means clustering method is applied to the newly acquired unlabeled training data.

As shown by block 601, the edge device 150 receives training data from the training database (e.g., the training database 190 shown in FIG. 1). In some implementations, the training data is sampled. In some implementation, the training data consists of at least one of non-augmented data or augmented data.

As shown by block 603, the edge device 150 performs a clustering on the received training data, wherein the clustering includes a number of clusters and data features that are known for an auto-labeling task. Unlike a traditional K-means clustering algorithm, the number of clusters is decided by the number of classes from the first and second neural networks, and the initial centroids of the data features are calculated and known based on pre-defined reference points for each of the clusters, rather than randomly initialized for the auto-labeling task in the clustering approach 600. As such, the edge device 150 (e.g., the edge device 150 shown in FIG. 1) starts with a fixed number of clusters (e.g., a cluster is assigned for each class) with known reference points (e.g., data points from training data that were used at a factory). This allows the initialization to begin with a fixed number of clusters with the known reference points. The known reference data points are the same as the data points from the training data that were used at the factory.

As shown by block 605, the edge device 150 determines a cluster ID for each received training data based on distance between the clusters. The edge device 150 can determine the classes that the received training data belongs to because a cluster is assigned for each class. Therefore, the edge device 150 forms clusters by comparing similarities between distance measurement for newly acquired training data and the known reference data points. In some implementations, the distance measurement used is a squared Euclidean distance.

As an example, the edge device 150 may initialize the clustering with a k constant of 5, wherein the number is acquired from the previous neural network classification tasks. This means that the edge device 150 will generate 5 clusters, each of which belongs to a different class in a hyperspace. Next, the edge device 150 calculates distances between the data and the 5 clusters and will repeat the process over again until there is no change to a centroid (e.g., assignment of data points to the clusters does not change). Finally, the edge device 150 classifies the data into 5 clusters based on the proximity of the data to each other. The closer the data points are, the more similar and likely the data points will belong to the same cluster.

As shown, by block 607, the edge device 150 inputs the clustering results into a third machine learning approach. The third machine learning approach is a separate machine learning approach from the first neural network and the second neural network that is based on unsupervised learning as a form of L-means clustering. In some implementations, the third machine learning approach may be interpreted to describe the entire L-means clustering process.

As shown, by block 609 the edge device 150 generates a third confidence condition based on the results of the third machine learning approach. The third confidence condition will be combined with the second confidence condition and the first confidence condition in order to determine whether results from the three confidence upgrade techniques (e.g., data augmentation, slightly overfitted neural network, and clustering) pass a confidence upgrade that is confidence enough to use approximated labels.

Figure 7:
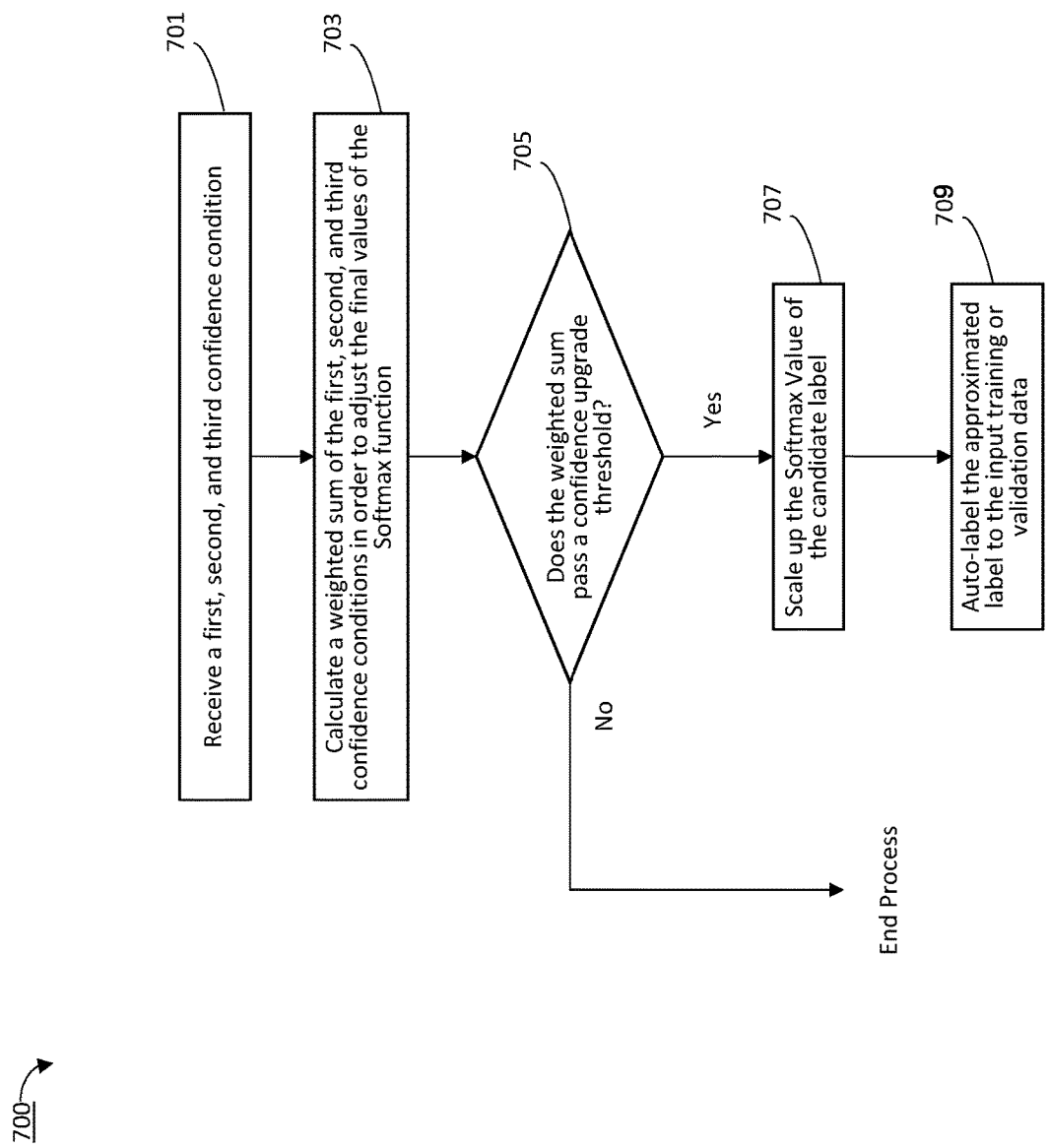
FIG. 7 is a flowchart of performing a confidence upgrade in accordance with some implementations.

In some implementations, the clustering approach 600 may be formalized as follows:
Initialize $L'_k$ with selected $x_o \in X$ for each of l output nodes for M
repeat 1) and 2) below until k=constraints for stop criteria $$\operatorname*{argmin}_{L'} \sum_{j=1}^{l} \sum_{x_i \in X_s} \|x_i - \mu_j\|^2, \quad 1)$$

where l is prefixed and $L' = \{l'_1, l'_2, \ldots, l'_l\}$ $$\mu_j = \frac{1}{|X_s|} \sum_{x_i \in X_s} x_i \quad 2)$$

$$l'_j = L'_k(x_j) \quad 3)$$

where the terms to this equation are defined as follows:
$x_o$: an input vector, $x_o \in X$
$x_i$: ith sampled input vector, $x_i \in X_s$
$x_j$: jth sampled input vector, $x_j \in X_s$
M: a pre-trained base neural network model for inference
$\mu$: a set of means by $\forall x \in X$, where $|\mu|$ is known by the number of output nodes by M
$\mu_i$: a mean of points, $\mu_i \in \mu$
$L'_k$: L-means clustering under the constraints k
$l'_j$: cluster ID for input $x_j$ by the L-means clustering $L'_k$ under the constraints k
l: prefixed number of clusters that is equal to the number of output nodes FIG. 7 is a flowchart of performing a confidence upgrade in accordance with some implementations. While certain specific features are illustrated, those skilled in the art will appreciate that from the present disclosure that various other features have not been illustrated for the sake of brevity, and so as not to obscure more pertinent aspects of the implementations disclosed herein. In some implementations, the confidence upgrade process 700 is performed by the edge learning module 180 (e.g., the edge learning module 180 shown in FIG. 1) on the edge device 150.

As shown in box 701, the confidence upgrade process receives a first confidence condition corresponding to results from the inference result consistency check (as described in FIG. 4), a second confidence condition corresponding to results from the slightly overfitted neural network (as described in FIG. 5B), and a third confidence condition relating to the clustering ID with a similarity measurement (as described in FIG. 6).

As shown in box 703, the edge device 150 calculates a weighted sum of the first confidence condition, the second confidence condition, the third confidence condition in order to adjust the final values of the Softmax function. In some implementations, the similarities and the cluster ID are used as part of the weighted adjustment for the scaled-up Softmax value for the label candidate. In some implementations, the initial Softmax values can be calculated as a result of the pre-trained base neural network model. Then, the final Softmax values are scaled-up from the initial Softmax values, as a weighted adjustment (i.e., the weighted sum of the first confidence condition, the second confidence condition, and the third confidence condition). Once the weighted sum of the output from the slightly overfitted neural network inference, the L-means clustering ID with similarity measurement, and the Softmax function are calculated and meets the confidence upgrade threshold, the Softmax function value of the candidate label is scaled up and the approximated label is assigned to the input training or validation data. In some implementations, a Softmax output of ~90% typically corresponds to a high confidence level.

As shown in box 705, the edge device 150 determines whether the weighted sum passes a confidence upgrade threshold. If the weighted sum passes a confidence upgrade threshold ("Yes" path of box 705), then the confidence upgrade process 700 scales up the Softmax function value of the candidate label, as shown in box 707. However, if the weighted sum does not pass a confidence upgrade threshold ("No" path of box 705, then the confidence upgrade process 700 ends.

As shown in box 709, the edge device 150 auto-labels the approximated label to the input training or validation data.

In some implementations, the confidence upgrade process by using a slightly overfitted inference neural network, the L-means clustering ID with similarity measure, and the Softmax function are formalized as follows:

$$y_i = M(x_i)$$

$$y'_i = M'_k(x_i)$$

$$C_i(x_i) = y_i + w'(y'_i) * w'''A(x_i, X_i^a),$$

$$l_i^0 = \max_{label}(C_i(x_i))$$

$$l'_i = L_k'(x_i)$$

$$C'_i(x_i) = C_i(x_i) + w''(y'_i) \text{ if } l_i^0 \text{ is equal to } l'_i,$$

$$C'_i(x_i) = C_i(x_i) - w''(y'_i) \text{ if } l_i^0 \text{ is not equal to } l'_i,$$

$$l_i = \max_{label}(C'_i(x_i))$$

where the terms to this equation are defined as follows:
$x_i$: ith input vector, $x_i \in X_s$
$X_i^a = \{x_i^1, x_i^2, \ldots, x_i^{n_a}\}$: a set of augmented data from the ith input vector, $x_i \in X_s$
$A(x_i, X_i^a)$: a function for inference consistency of the augmented data $X_i^a$
M: a pre-trained base neural network model for inference
$M_k'$: a slightly overfitted neural network model under the constraints k
$y_i$: Softmax output for input $x_i$ by the pre-trained base neural network model M
$y_i'$: Softmax output for input $x_i$ by the overfitted neural network model $M_k'$
w': weight for the output of overfitted neural network
w'': weight for the output of overfitted neural network on the condition of $L'_k$ result
w''': weight for the inference consistency output of $A(x_i, X_a)$
$L'_k$: L-means clustering
$C_i(x_i)$: output of the initial confidence upgrade for input $x_i$ $l_i^0$: label with the maximum Softmax output by the initial confidence upgrade $C_i(x_i)$ $l_i'$: cluster ID for input $x_i$ by the L-means clustering $L'_k$ under the constraints k $C_i'(x_i)$: output of the confidence upgrade for input $x_i$, with the weighted adjustment on the condition of $L'_k$ result $l_i$: final estimated label for $x_i$ Short-Term and Long-Term Validation It follows that a possible solution for overcoming the challenges of acquiring enough training data without manual labeling is to automatically generate labels for unlabeled data as described above. However, there is no guarantee whether the neural network will perform within accepted parameters over a longer time period and, also, after the neural network is updated with a series of different model parameter updates based on automatically generated labeled training data. Therefore, a need arises for validating the performance of a pre-trained neural network trained by automatically-labeled training and validation data after a series of model parameter updates.

In machine learning, the semi-supervised learning and/or self-supervised learning methods utilize a set of labeled data in order to approximate a set of un-labeled data during a transfer learning phase. Accordingly, changes due to the approximation results being non-deterministic, the proposed label approximations and consequent output of the transfer learning using the approximated labels by the neural network are validated for correctness and its degree of. As such, the goal of the edge device transfer learning process is to monitor whether the repeated updates of the model parameters using the approximated labels are within a predefined range of performance in terms of accuracy. The validation is particularly useful when the transfer learning is executed on an edge device. In some implementations, the validation may be applied to a smaller size of mini-batch training data in order to incrementally learn from newly acquired data on the edge device. The goal of the validation process is to see a relative improvement of the newly learned and proposed model parameters in a specific physical space under physical constraints while risking a slightly overfitting of the model parameters rather than to see a generalized improvement of the neural network model for general cases.

Figure 8:
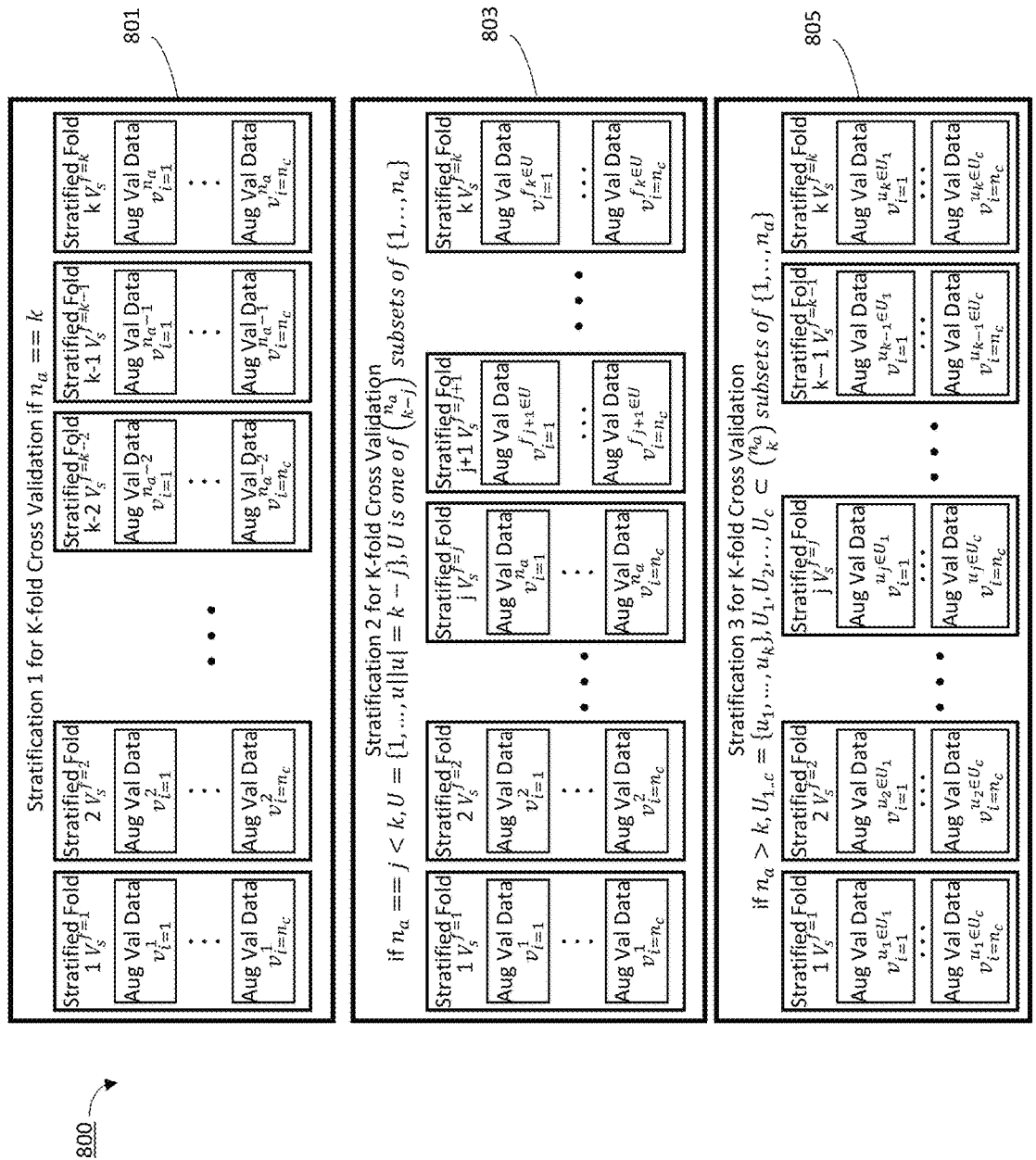
FIG. 8 is an embodiment of performing stratification for k-fold utilizing the augmented validation data in accordance with some implementations.

FIG. 8 is an embodiment of performing stratification for k-fold utilizing the augmented validation data in accordance with some implementations. The edge device 150 (e.g., the edge device 150 shown in FIG. 1) applies a stratified k-fold cross validation technique to automatically labeled training and validation data in a novel way. Although the automatically labeled validation data does not guarantee the correctness of the approximation in a deterministic way, the labels of the augmented data from the automatically labeled data provide a practice cue that the data representation of the validation data is evenly distributed in the k-fold subsets of the validation data. Here, the stratification process 800 attempts to validate the newly proposed model parameters over the automatically generated (or approximated) labeled data on the edge device.

In some implementations, the stratification process 800 includes performing a stratification of k-fold (e.g., subsets of the automatically-labeled validation data) based on the augmented data group and the inference result consistency check (explained in further detail with respect to FIG. 4). The stratification is a process of making the data representation in each fold not be biased such that the data representation in each fold is fairly distributed among the given number of classes (e.g., $n_c$) by having the data points from each class present in each fold. Since the edge device 150 (e.g., the edge device 150 shown in FIG. 1) augments the validation data per label, each augmented data per label can be assigned to each fold in the stratification process.

In some implementations, the stratification process is formalized as follows:

$$V_s^{f=1} = \{v_{i=1}^1, v_{i=2}^1, \ldots, v_{i=n_c}^1\}$$

$$V_s^{f=2} = \{v_{i=1}^2, v_{i=2}^2, \ldots, v_{i=n_c}^2\}$$

$$\ldots V_s^{f=k} = \{v_{i=1}^k, v_{i=2}^k, \ldots, v_{i=n_c}^k\}$$

where the terms to these components are defined as follows:

$n_c$: number of classes $n_a$: number of augmentations per each source input vector k: number of folds $v_i^f$: $i_{th}$ vector for validation, $v_i^f \in V^f$, $V^f$: a fold as a subset of vectors for validation, $V^f \subset V_c$ $V_s^f$: a stratified fold as a subset of vectors for validation, $V_s^f \subset V_c$ $V_c$: a set of vectors for validation for class c In some implementations, the size of k is predefined during base model training. It is also noted that the size of k is not necessarily the same as $n_a$ while the stratification should have a good representation of the $n_c$ classes. Therefore, the $n_a$ are distributed in a manner such that each fold includes approximately an equal number of validation data from each class.

As previously mentioned above, in a semi-supervised learning scenario, the labels of the newly acquired unlabeled data are approximated. Therefore, there is no guarantee that the approximations are correct because the labels are approximated in a non-deterministic manner. However, the edge learning module 180 (e.g., the edge learning module 180 shown in FIG. 1) takes advantage of the fact that augmented data from the same group should have the same label and the same distribution of the augmented data over the k-folds. Thus, the edge device 150 augments the approximately labeled data and distributes them over the k-folds to ensure a fair representation of the approximated labels in each fold.

In some implementations, the edge learning processing system constructs stratified k-fold differently because the size of k is not the same as $n_a$. FIG. 8 depicts three different situations: (1) a first case of stratification 801 where the size of $n_a=k$, (2) a second case of stratification 803 where the size of $n_a<k$, and (3) a third case of stratification 805 where the size of $n_a>k$. The goal is to ensure that stratification has a good representation of the $n_c$ classes for each fold. In some implementations, a good representation in a subset (i.e., fold) is defined as a validation data distribution that represents the training data. Therefore, the $n_a$ number of augmented data from a source data are distributed in a manner in which each fold includes approximately an equal number of validation data from each class.

As shown in FIG. 8, for the first case of stratification 801, the $n_a$ number of augmented data is evenly distributed over the folds if $n_a=k$. In the second case of stratification 803, if $n_a<k$, then the edge learning process system first distributes the $n_a$ number of augmented data over the folds and the edge learning processing system chooses one of $$\binom{n_a}{k-j}$$

subsets of $\{1, \ldots, n_a\}$ and distributes the subset of augmented data to the remaining folds, i.e. (k-j) folds. For the third case of stratification 805, if $n_a > k$, then the present disclosure first chooses $U_1, \ldots, c = \{u_1, \ldots, u_k\}$, $U_1$, $U_2, \ldots, U_c \subset \binom{n_a}{k}$ subsets of $\{1, \ldots, n_a\}$ and the edge learning processing system distributes the chosen augmented data to the k folds. It is noted that the present disclosure attempts to have an equal chance of representation of the $n_c$ classes for each fold in any of these three cases.

Figure 9:
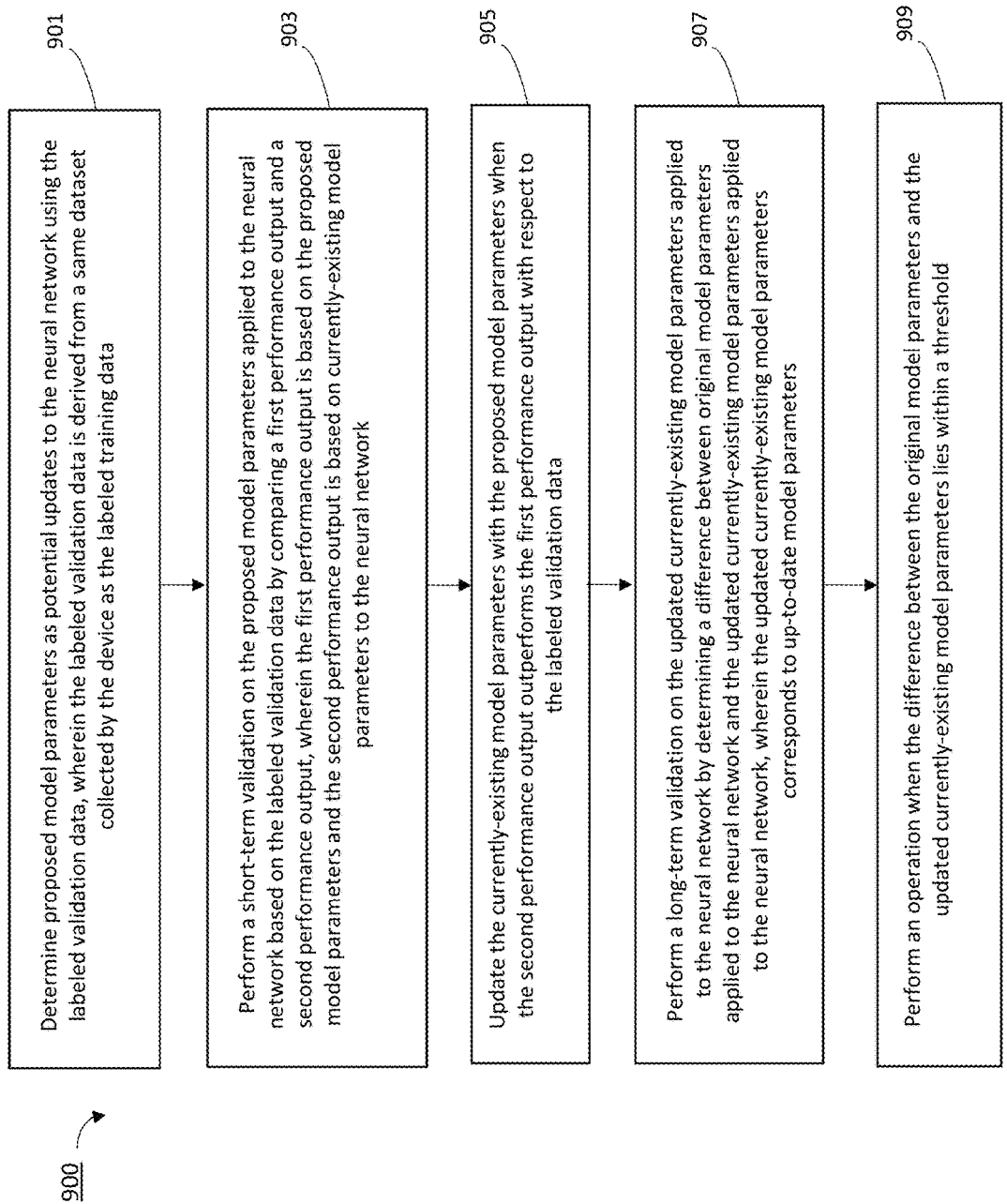
FIG. 9 is a flowchart of validating a performance of a pretrained neural network trained by using automatically-labeled training and validation data that is generated based on data collected by a device in accordance with some implementations.

FIG. 9 is a flowchart of validating a performance of a pretrained neural network trained by using automatically-labeled training and validation data that is generated based on data collected by a device in accordance with some implementations. In various implementations, the method 900 is performed by a device (e.g., the edge device 150 shown in FIG. 1 or the edge device 1100 shown in FIG. 11) with one or more processors and a non-transitory memory. In some implementations, the method 900 is performed by processing logic including hardware, firmware, software, or a combination thereof. In some implementations, the method 900 is performed by a processor executing code stored in a non-transitory computer-readable medium (e.g., a memory).

As represented by block 901, the method 900 includes determining proposed model parameters as potential updates to the neural network using the labeled validation data, wherein the labeled validation data is derived from a same dataset collected by the device as the automatically-labeled training data. In some implementations, the edge device 150 (e.g., the edge device 150 shown in FIG. 1) learns the proposed model parameters by performing a forward pass calculation and a backpropagation over the auto-labeled training data.

In some implementations, the labeled training data is selected from input data that are captured by the sensors (e.g., the sensors 130) connected to the edge device 150 because it is not practical to manually acquire training and validation data when the edge device 150 is deployed to a real-world environment.

As represented by block 903, the method 900 includes performing a short-term validation on the proposed model parameters applied to the neural network based on the labeled validation data by comparing a first performance output and a second performance output, wherein the first performance output is determined from applying the proposed model parameters to the pretrained neural network and the second performance output is determined from applying currently-existing model parameters to the neural network.

As represented by block 905, the method 900 includes updating the currently-existing model parameters with the proposed model parameters when the second performance output outperforms the first performance output with respect to the labeled validation data. The method 900 further includes discarding the labeled training data and the labeled validation data when the first performance output outperforms the second performance output with respect to the labeled data. The method 900 further includes updating the model parameters by replacing the values of the currently existing model parameters with the new ones when the second performance output outperforms the first performance output with respect to the labeled data. In some implementations, the method 900 further includes saving an instance of the currently-existing model parameters as a previously existing model parameters before updating the currently-existing model parameters with the proposed model parameters. In some implementations, the method 900 further includes transferring the proposed model parameters to a memory (e.g., the memory 160 shown in FIG. 1) to replace the updated currently-existing model parameters, wherein the memory is accessible by a processor.

In some implementations, the updated model parameters are also stored in a database (e.g., memory 160 shown in FIG. 1) for model parameter records. Previous validation measurements with corresponding model parameters in the model parameter records may provide useful information regarding the newly proposed model parameters. For example, a threshold may be adjusted based on a weighted average of the performance by using previous validation measurements with the corresponding model parameters that were used for successful model parameter updates. This also helps in assuring that the performance improvements using the newly proposed model parameters are not trivial.

In some implementations, the short-term validation is formalized as follows:

$y_i^t = M^t(x_i)$, with a set of current model parameters $P_t = \text{param}(M^t)$ $y_i^{t+1} = M^{t+1}(x_i)$, with a set of proposed model parameters $P_{t+1} = \text{param}(M^{t+1})$ $P_{t+1}$ passes the short term validation test, if $(\text{mAP}(y_i^{t+1}) - \text{mAP}(y_i^t)) > \theta_{sv}$ for $n_{sv}$ number of $x_i \in X^{f=k}$ Save $\text{param}(M^{t+1})$ to a history of model parameters $H^p$, where the terms to this equation are defined as follows:

$x_i$: $i_{th}$ input vector, $x_i \in X^{f=k}$, $X^{f=k} \in X_s$ $X_s$: a set of sampled input vectors $X^{f=k}$: $k_{th}$ fold in the set of sampled input vectors $X_s$ $y_i^t$: Softmax output for $i_{th}$ input vector $x_i$ by the current neural network $M^t$ $y_i^{t+1}$: Softmax output for ith input vector $x_i$ by the proposed neural network $M^{t+1}$ $\theta_{sv}$: pre-defined threshold for short term validation $n_{sv}$: pre-defined number of input vectors that should pass for short term validation In some implementations, the sizes of $n_{sv}$ and k in the k-fold cross validation are predefined during the base model training that occurs on the training server (e.g., the training server 110 shown in FIG. 1).

As explained above, from a global perspective, the series of local validations (e.g., short-term validation) will not guarantee the performance coverage of the neural network in a long run. Therefore, it is necessary to process a longer-term validation process on the neural network after a predefined interval that captures a series of model parameter updates.

As represented by block 907, the method 900 includes performing the long-term validation on the updated currently-existing model parameters applied to the neural network by determining a difference between original model parameters applied to the neural network and the updated currently-existing model parameters applied to the neural network, wherein the updated currently-existing model parameters corresponds to up-to-date model parameters.

In some implementations, the long-term validation is formalized as follows:

Stage 1:

$y_i^o = M^o(x_i)$, with a set of original model parameters $P_{t=0} = \text{param}(M^o)$, $P_{t=0} \in H^p$ $y_i^t = M^t(x_i)$, with a set of current model parameters $P_t = \text{param}(M^t)$, $P_t \in H^p$ $y_i^{t+1} = M^{t+1}(x_i)$, with a set of proposed model parameters $P_{t+1} = \text{param}(M^{t+1})$ $P_{t+1}$ passes the long term validation stage 1 test,
  if $\Sigma_{k=0}^{t}(mAP(y_i^{k+1})-mAP(y_i^k))<\theta_{lv}$ for $n_{lv}$ number of $x_i \in X^{f=k}$ $P_{t+1}$ passes the short term validation stage 1 test,
  if $(mAP(y_i^{t+1})-mAP(y_i^t))>\theta_{sv}$ for $n_{sv}$ number of $x_i \in X^{f=k}$ where the terms to this equation are defined as follows:
$x_i$: $i_{th}$ input vector, $x_i \in X^{f=k}$, $X^{f=k} \subset X_s$
$X_s$: a set of sampled input vectors
$X^{f=k}$: $k_{th}$ fold in the set of sampled input vectors $X_s$
$y_i^o$: Softmax output for ith input vector $x_i$ by the original neural network $M^o$
$y_i^t$: Softmax output for ith input vector $x_i$ by the current neural network $M^t$
$y_i^{t+1}$: Softmax output for ith input vector $x_i$ by the proposed neural network $M^{t+1}$
$\theta_{lv}$: pre-defined threshold for long term validation
$\theta_{sv}$: pre-defined threshold for short term validation
$n_{lv}$: pre-defined number of input vectors that should pass for long term validation
$n_{sv}$: pre-defined number of input vectors that should pass for short term validation
$H^p$: a history of model parameters Stage 2:
$y_r^o = M^o(x_r)$, with a set of original model parameters $P_{t=0} = )param(M^o)$, $P_{t=0} \in H^p$
$y_r^t = M^t(x_r)$, with a set of current model parameters $P_t = param(M^t)$, $P_t \in H^p$
$y_r^{t+1} = M^{t+1}(x_r)$, with a set of proposed model parameters $P_{t+1} = param(M^{t+1})$ $P_{t+1}$ passes the long term validation stage 2 test,
  if $\Sigma_{k=0}^{t}(mAP(y_r^{k+1})-mAP(y_r^k))<\theta_{lv}$ for $n_{lv}$ number of $x_r \in X_r$ $P_{t+1}$ passes the short term validation stage 2 test,
  if $(mAP(y_r^{t+1})-mAP(y_r^t))>\theta_{sv}$ for $n_{sv}$ number of $x_r \in X_r$ where the terms to this equation are defined as follows:
$x_r$: rth input vector, $x_r \in X_r$
$X_r$: a set of reference input vectors
$y_r^o$: Softmax output for rth input vector $x_r$ by the original neural network $M^o$
$y_r^t$: Softmax output for rth input vector $x_r$ by the current neural network $M^t$
$y_r^{t+1}$: Softmax output for rth input vector $x_r$ by the proposed neural network $M^{t+1}$ Stage 3:
$P_{t+1}$ passes the long term validation test
  if $P_{t+1}$ passes both stage 1 and stage 2 long term validation tests,
$P_{t+1}$ passes the short term validation test
  if $P_{t+1}$ passes both stage 1 and stage 2 short term validation tests,
if $P_{t+1}$ passes both the long term validation test and the short term validation test Save param($M^{t+1}$) to a history of model parameters $H^p$, In some implementations, the sizes of $n_{lv}$, $n_{sv}$ and k in the k-fold cross validation are predefined during the base model training that occurs on the training server (e.g., the training server 110 shown in FIG. 1).

As represented by block 909, the method 900 includes performing an operation when the difference between the original model parameters and the updated currently-existing model parameters lies within a threshold. In some implementations, the method 900 further includes adjusting the updated currently-existing model parameters when the difference between the original model parameters and the updated currently-existing model parameters lies outside the threshold, wherein adjusting the updated currently-existing model parameters further comprises: setting the updated currently-existing model parameters to a previously existing model parameters, performing a factory reset on the updated currently-existing model parameters to the original model parameters, or updating the updated currently-existing model parameters to a new set of model parameters over a network. In some implementations, the threshold or the original model parameters is set through updates over a network 120 (e.g., the network 120 shown in FIG. 1).

In some implementations, wherein the difference between the original model parameters and the updated currently-existing model parameters is determined by comparing a first median average precision related to a first performance of the original parameters applied to the pretrained neural network and a second median average precision related to a second performance of the updated currently-existing model parameters applied to the pretrained neural network.

Figure 10:
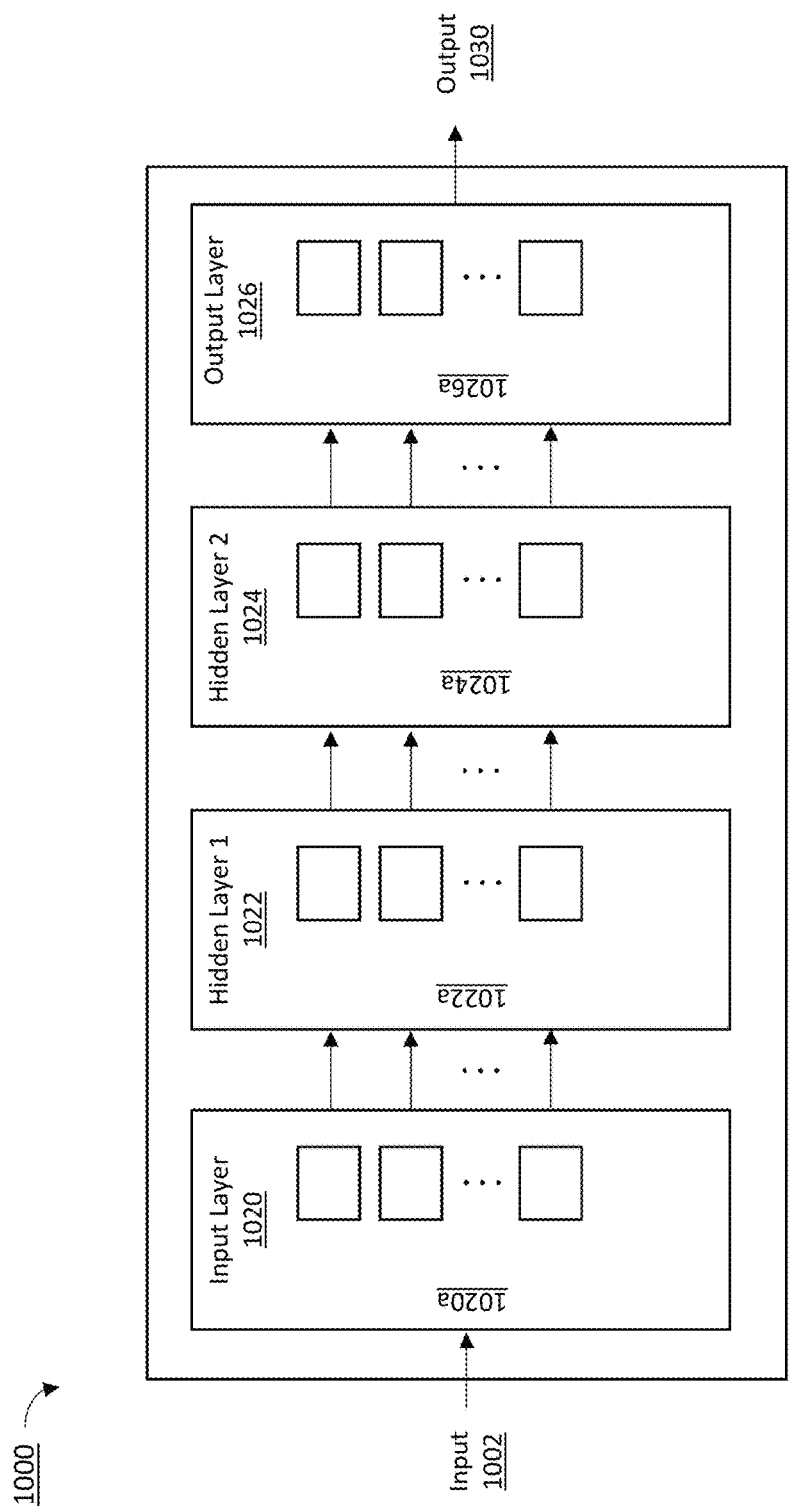
FIG. 10 is a block diagram of an example neural network in accordance with some implementations.

FIG. 10 is a block diagram of an example neural network 1000 according to some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the neural network 1000 includes an input layer 1020, a first hidden layer 1022, a second hidden layer 1024, and an output layer 1026. While the neural network 1000 includes two hidden layers as an example, those of ordinary skill in the art will appreciate from the present disclosure that one or more additional hidden layers are also present in various implementations. Adding additional hidden layers adds to the computational complexity and memory demands but may improve performance for some applications.

In various implementations, the input layer 1020 is coupled (e.g., configured) to receive various inputs 1002 (e.g., image data). For example, the input layer 1020 receives pixel data from one or more image sensors (e.g., the image sensor 132 shown in FIG. 1). In various implementations, the input layer 1020 includes a number of long short-term memory (LSTM) logic units 1020$a$, which are also referred to as model(s) of neurons by those of ordinary skill in the art. In some such implementations, an input matrix from the features to the LSTM logic units 1020$a$ include rectangular matrices. For example, the size of this matrix is a function of the number of features included in the feature stream.

In some implementations, the first hidden layer 1022 includes a number of LSTM logic units 1022$a$. In some implementations, the number of LSTM logic units 1022$a$ ranges between approximately 10-500. Those of ordinary skill in the art will appreciate that, in such implementations, the number of LSTM logic units per layer is orders of magnitude smaller than previously known approaches (being of the order of O(101) to O(102)), which allows such implementations to be embedded in highly resource-constrained devices. As illustrated in the example of FIG. 10, the first hidden layer 1022 receives its inputs from the input layer 1020. For example, the first hidden layer 1022 performs one or more of following: a convolutional operation, a nonlinearity operation, a normalization operation, a pooling operation, and/or the like.

In some implementations, the second hidden layer 1024 includes a number of LSTM logic units 1024$a$. In some implementations, the number of LSTM logic units 1024$a$ is the same as or similar to the number of LSTM logic units 1020$a$ in the input layer 1020 or the number of LSTM logic units 1022a in the first hidden layer 1022. As illustrated in the example of FIG. 10, the second hidden layer 1024 receives its inputs from the first hidden layer 1022. Additionally and/or alternatively, in some implementations, the second hidden layer 1024 receives its inputs from the input layer 1020. For example, the second hidden layer 1024 performs one or more of following: a convolutional operation, a nonlinearity operation, a normalization operation, a pooling operation, and/or the like.

In some implementations, the output layer 1026 includes a number of LSTM logic units 1026a. In some implementations, the number of LSTM logic units 1026a is the same as or similar to the number of LSTM logic units 1020a in the input layer 1020, the number of LSTM logic units 1022a in the first hidden layer 1022, or the number of LSTM logic units 1024a in the second hidden layer 1024. In some implementations, the output layer 1026 is a task-dependent layer that performs a computer vision related task such as feature extraction, object recognition, object detection, pose estimation, or the like. In some implementations, the output layer 1026 includes an implementation of a multinomial logistic function (e.g., a soft-max function) that produces a number of outputs 1030.

Neural networks, such as CNNs are often used to solve computer vision problems including feature extraction, object recognition, object detection, and pose estimation. A modern CNN is typically described as having an input layer, a number of hidden layers, and an output layer. In at least some scenarios, the input to the input layer of the CNN is an image frame while the output layer is a task-dependent layer. The hidden layers often include one of a plurality of operations such as convolutional, nonlinearity, normalization, and pooling operations. For example, a respective convolutional layer may include a set of filters whose weights are learned directly from data. Continuing with this example, the output of these filters are one or more feature maps that are obtained by applying filters to the input data of the convolutional layer.

Figure 11:
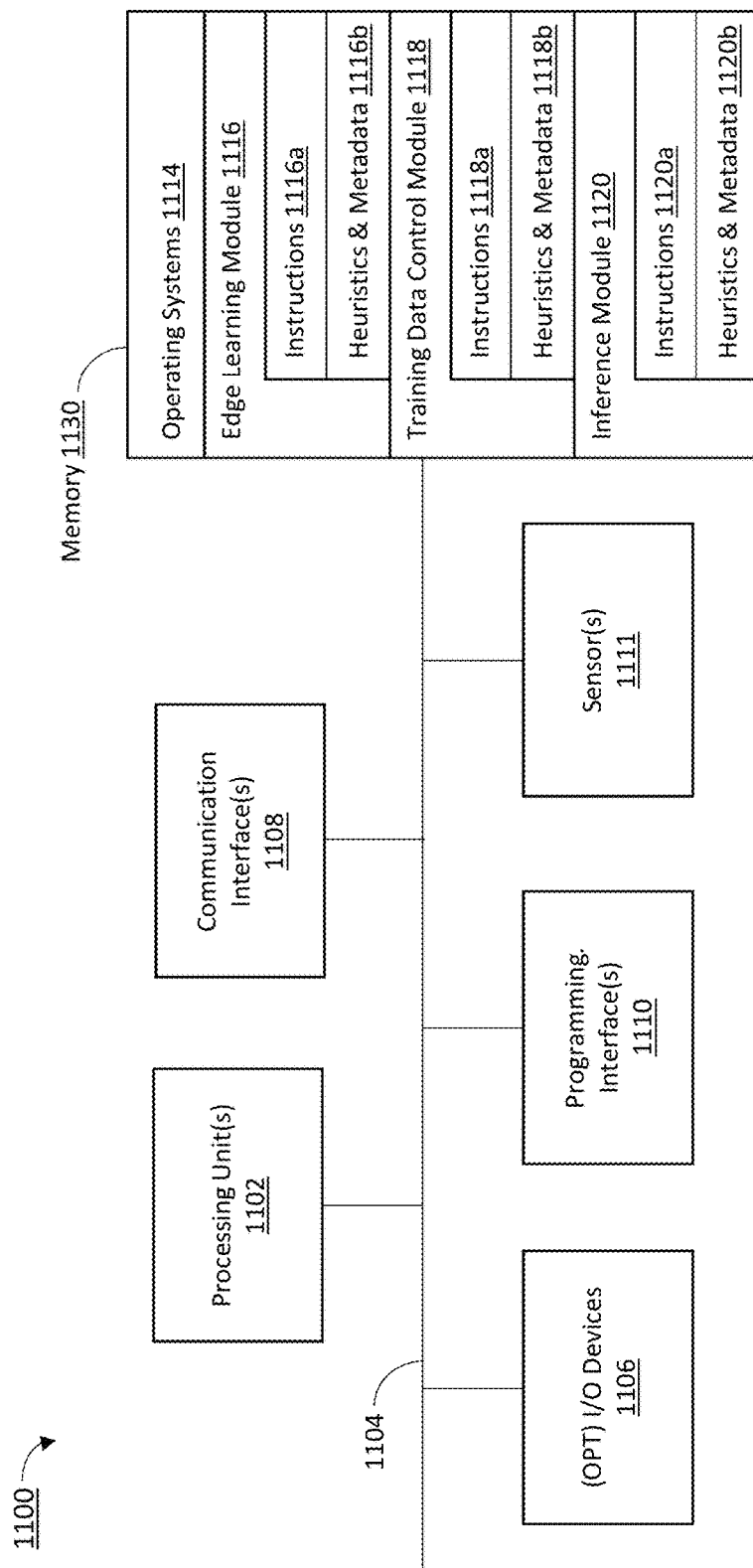
FIG. 11 is a block diagram of an edge device in accordance with some implementations.

FIG. 11 is a block diagram of an example edge device (e.g., the edge device 150 shown in FIG. 1) configured in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 1100 includes one or more processing units 1102 (e.g., NMP, microprocessors, ASICs, FPGAs, GPUs, CPUs, processing cores, and/or the like), one or more optional I/O devices 1106, one or more communications interfaces 1108 (e.g., USB, FIRE-WIRE, THUNDERBOLT, IEEE 802.3x, IEEE 802.11x, IEEE 802.16x, GSM, CDMA, TDMA, GPS, IR, BLU-ETOOTH, ZIGBEE, and/or the like type interfaces), one or more programming (e.g., I/O) interfaces 1110, one or more sensor(s) 1111, a memory 1130, and one or more communication buses 1104 for interconnecting these and various other components.

In some implementations, the one or more communication buses 1104 include circuitry that interconnects and controls communications between system components.

In some implementations, the sensors 1111 are configured to obtain image data frames. For example, the sensors 1111 correspond to one or more RB cameras (e.g., with a complementary metal-oxide-semiconductor (CMOS) image sensor, or a charge-coupled device (CCD) image sensor), infrared (IR) image sensors, event-based cameras, a microphone, and/or the like.

The memory 1130 includes high-speed random-access memory, such as DRAM, SRAM, DDR RAM, or other random-access solid-state memory devices. In some implementations, the memory 1130 includes non-volatile memory, such as one or more magnetic disk storage devices, optical disk storage devices, flash memory devices, or other non-volatile solid-state storage devices. The memory 1130 optionally includes one or more storage devices remotely located from the one or more processing units 1102. The memory 1130 comprises a non-transitory computer readable storage medium. In some implementations, the memory 1130 or the non-transitory computer readable storage medium of the memory 1130 stores the following programs, modules and data structures, or a subset thereof including an optional operating system 1114, an edge learning module 1116, a training data control module 1118, and an inference module 1120.

The optional operating system 1114 includes procedures for handling various basic system services and for performing hardware dependent tasks.

In some implementations, the edge learning module 1116 is configured to perform data augmentation, confidence upgrade, auto-labeling the training and validation data, perform short-term and long-term validation, and update the neural network parameters. To that end, in various implementations, the edge learning module 1116 includes instructions 1116a and/or logic therefor, and heuristics and metadata 1116b therefore.

In some implementations, the training data control module 1118 is configured to determine a size of training data and schedule when to initiate the execution of the neural network training for edge learning. To that end, in various implementations, the training data control module 1118 includes instructions 1118a and/or logic therefor, and heuristics and metadata 1118b therefore.

In some implementations, the inference module 1120 is configured to produce inference results for the training and validation data and to perform an inference consistency check in an augmented data group. To that end, in various implementations, the inference module 1120 includes instructions 1120a and/or logic therefor, and heuristics and metadata 1120b therefore.

Although the edge learning module 1116, the training data control module 1118, and the inference module 1120 are shown as residing on a single device (e.g., the edge device 1100), it should be understood that in some implementations, any combination the edge learning module 1116, the training data control module 1118, and the inference module 1120 may be located in separate computing devices. 1

Moreover, FIG. 11 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 11 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first image could be termed a second image, and, similarly, a second image could be termed a first image, which changing the meaning of the description, so long as the occurrences of the "first image" are renamed consistently and the occurrences of the "second image" are renamed consistently. The first image and the second image are both images, but they are not the same image.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method, comprising:
   inputting candidate data into a first neural network to filter the candidate data by selecting a subset of the candidate data based on an output of the first neural network, wherein the first neural network is pretrained;
   performing a confidence upgrade check on the subset of candidate data by:
   performing a data consistency check by generating augmented data from each candidate data from among the subset of candidate data, wherein the generated augmented data are used as inputs into the first neural network to determine a first confidence condition for each of the subset of candidate data,
   inputting the subset of candidate data into a second neural network that is trained using data from an environment to determine a second confidence condition, wherein the second neural network is a version of the first neural network overfitted to the environment, and
   performing a clustering on the subset of candidate data, wherein results from the clustering on the subset of candidate data are used as inputs into a third machine learning approach to determine a third confidence condition; and
   automatically labeling, as training data, the subset of candidate data from among the subset of candidate data in accordance with a confidence level label based on the first confidence condition, the second confidence condition, and the third confidence condition.

2. The method of claim 1, wherein the candidate data corresponds to newly acquired data captured by sensors on a device, wherein the newly acquired data corresponds to visual or audio data specific to the environment.

3. The method of claim 1, wherein the first neural network is based on a simplified version of a base neural network model.

4. The method of claim 1, wherein performing the data consistency check further comprises:
   assigning a group identification to the augmented data, wherein the group identification indicates a source for the generated augmented data;
   comparing a candidate label with other candidate labels in an augmented data group with a same group identification; and
   increasing a weight of the first confidence condition based on a confidence of the candidate label when the candidate label is consistent with the other candidate labels in the augmented data group with the same group identification.

5. The method of claim 1, wherein the augmented data are created by at least one of: shifting, scaling, translating, or rotating an image from the subset of candidate data.

6. The method of claim 1, wherein the clustering includes a known fixed number of clusters with known reference data points.

7. The method of claim 1, wherein the clustering is based on comparing distance measurements for the subset of candidate data with known reference points and measuring similarities between the distance measurements in order to form clusters.

8. The method of claim 1, wherein the first confidence condition is based on results from the data consistency check, the second confidence condition corresponds to a result from the output of the second neural network, and the third confidence condition corresponds to a result from the output of the third machine learning approach.

9. The method of claim 1, wherein the automatically labeled subset of candidate data is differentiated into automatically-labeled training data and automatically-labeled validation data.

10. The method of claim 1, wherein automatically labeling the subset of candidate data from among the subset of candidate data is performed while a device is charging at a dock station.

11. An edge device, the edge device comprising:
one or more processors;
a non-transitory memory; and
one or more programs stored in the non-transitory memory, which, when executed by the one or more processors, cause the edge device to be configured to perform:
inputting candidate data into a first neural network to filter the candidate data by selecting a subset of the candidate data based on an output of the first neural network, wherein the first neural network is pretrained;
performing a confidence upgrade check on the subset of candidate data by:
performing a data consistency check by generating augmented data from each candidate data from among the subset of candidate data, wherein the generated augmented data are used as inputs into the first neural network to determine a first confidence condition for each of the subset of candidate data,
inputting the subset of candidate data into a second neural network that is trained using data from an environment to determine a second confidence condition, wherein the second neural network is a version of the first neural network overfitted to the environment, and
performing a clustering on the subset of candidate data, wherein results from the clustering on the subset of candidate data are used as inputs into a third machine learning approach to determine a third confidence condition; and
automatically labeling, as training data, the subset of candidate data from among the subset of candidate data in accordance with a confidence level label based on the first confidence condition, the second confidence condition, and the third confidence condition.

12. The edge device of claim 11, wherein the candidate data corresponds to newly acquired data captured by sensors on a device, wherein the newly acquired data corresponds to visual or audio data specific to the environment.

13. The edge device of claim 11, wherein the first neural network is based on a simplified version of a base neural network model.

14. The edge device of claim 11, wherein performing the data consistency check further comprises:
assigning a group identification to the augmented data, wherein the group identification indicates a source for the generated augmented data;
comparing a candidate label with other candidate labels in an augmented data group with a same group identification; and
increasing a weight of the first confidence condition based on a confidence of the candidate label when the candidate label is consistent with the other candidate labels in the augmented data group with the same group identification.

15. The edge device of claim 11, wherein the augmented data are created by at least one of: shifting, scaling, translating, or rotating an image from the subset of candidate data.

16. The edge device of claim 11, wherein the clustering includes a known fixed number of clusters with known reference points.

17. The edge device of claim 11, wherein the clustering is based on comparing distance measurements for the subset of candidate data with known reference points and measuring similarities between the distance measurements in order to form clusters.

18. The edge device of claim 11, wherein the first confidence condition is based on results from an inference result consistency check, the second confidence condition corresponds to a weighted sum of an output from the second neural network, and the third confidence condition corresponds to a result from the output of the third machine learning approach.

19. The edge device of claim 11, wherein the automatically labeled subset of candidate data is differentiated into automatically-labeled training data and automatically-labeled validation data.

20. The edge device of claim 11, wherein automatically labeling the subset of candidate data from among the subset of candidate data is performed while the edge device is charging at a dock station.

21. A machine-readable non-transitory medium having stored thereon machine-executable instructions for labeling training data for machine learning, the instructions comprising:
inputting candidate data into a first neural network to filter the candidate data by selecting a subset of the candidate data based on an output of the first neural network, wherein the first neural network is pretrained;
performing a confidence upgrade check on the subset of candidate data by:
performing a data consistency check by generating augmented data from each candidate data from among the subset of candidate data, wherein the generated augmented data are used as inputs into the first neural network to determine a first confidence condition for each of the subset of candidate data,
inputting the subset of candidate data into a second neural network that is trained using data from an environment to determine a second confidence condition, wherein the second neural network is a version of the first neural network overfitted to the environment, and
performing a clustering on the subset of candidate data, wherein results from the clustering on the subset of candidate data are used as inputs into a third machine learning approach to determine a third confidence condition; and
automatically labeling, as training data, the subset of candidate data from among the subset of candidate data in accordance with a confidence level label based on the first confidence condition, the second confidence condition, and the third confidence condition.

* * * * *